US007454132B2

(12) United States Patent
Oya

(10) Patent No.: US 7,454,132 B2
(45) Date of Patent: Nov. 18, 2008

(54) LINKAGE MECHANISM BETWEEN ZOOM LENS BARREL UNIT AND ZOOM MEMBER, CAMERA, AND METHOD OF ASSEMBLING ILLUMINATION RANGE-CHANGING DEVICE AND ZOOM FINDER DEVICE

(75) Inventor: Takahiro Oya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 11/335,151

(22) Filed: Jan. 19, 2006

(65) Prior Publication Data

US 2006/0193617 A1  Aug. 31, 2006

(30) Foreign Application Priority Data

Jan. 19, 2005  (JP)  ............................. 2005-011972
Jan. 19, 2005  (JP)  ............................. 2005-011973

(51) Int. Cl.
*G03B 17/00*  (2006.01)
(52) U.S. Cl. .......................................... 396/83; 396/82
(58) Field of Classification Search ................... 396/62, 396/72, 73, 83, 84, 175, 349, 379
See application file for complete search history.

(56) References Cited

U.S. PATENT DOCUMENTS

| 5,083,146 A | * | 1/1992 | Ueda ............................. 396/62 |
| 5,673,099 A | * | 9/1997 | Haraguchi et al. ........... 396/379 |
| 6,600,877 B2 | * | 7/2003 | Shimizu et al. ................ 396/62 |

FOREIGN PATENT DOCUMENTS

| JP | 9-211556 | 8/1997 |
| JP | 2004-145044 | 5/2004 |

\* cited by examiner

*Primary Examiner*—W. B. Perkey
*Assistant Examiner*—Minh Phan
(74) *Attorney, Agent, or Firm*—Morgan & Finnegan, LLP

(57) ABSTRACT

A linkage mechanism between a zoom strobe device and a zoom finder device, which contributes to reduced size of a camera, and can control the illumination range of the zoom strobe device and the magnification of a finder optical system of the zoom finder device. A cam plate is disposed linearly movably in a direction orthogonal to an optical axis of a zoom lens barrel unit. The linear motion of the cam plate changes the magnification of the zoom finder optical system and the range of illumination with strobe light. A linkage member is disposed movable along the optical axis. The linkage member has an engaging portion for being engaged with a cam groove formed in the outer periphery of a drive ring, and moves along the optical axis as the engaging portion moves following the cam groove along with rotation of the drive ring, thereby causing the cam plate to move linearly along the optical axis.

11 Claims, 21 Drawing Sheets

WIDE ←→ TELE

LINKAGE MECHANISM BETWEEN ZOOM LENS BARREL UNIT AND ZOOM MEMBER, CAMERA, AND METHOD OF ASSEMBLING ILLUMINATION RANGE-CHANGING DEVICE AND ZOOM FINDER DEVICE

BACKGROUND OF THE INVENTION

1. Field of the Invention

The present invention relates to a linkage mechanism between a zoom lens barrel unit and a zoom member, a camera incorporating a linkage mechanism between a zoom lens barrel unit and an illumination range-changing device that changes the range of illumination with illuminating light and between the zoom lens barrel unit and a zoom finder device that changes the magnification of a finder optical system, and a method of assembling the illumination range-changing device and the zoom finder device.

2. Description of the Related Art

Conventionally, some cameras incorporate a linkage mechanism between a zoom strobe device that changes the range of illumination with strobe light in a manner interlocked with the motion of a drive ring for driving a zoom lens barrel unit, and a zoom finder device that changes the magnification of a finder optical system in a manner interlocked with the motion of the drive ring (see e.g. Japanese Laid-Open Patent Publication (Kokai) No. H09-211556).

A description will be given of a linkage mechanism of the above-mentioned kind with reference to FIG. 26, which shows, in cross-section, main components of a conventional linkage mechanism between a zoom strobe device and a zoom finder device.

As shown in FIG. 26, the linkage mechanism has a rotation axis parallel to the direction of motion (direction of the optical axis) of an objective lens 302 of the zoom finder device, and includes a zoom finder cam ring 301 that performs zooming of the zoom finder device, and a strobe cam ring 401 that changes the angle of illumination by the zoom strobe device.

An outer peripheral gear 101 provided on the zoom lens barrel unit transmits the rotation of the zoom lens barrel unit to the finder cam ring 301 via a transmission gear train 201, and the finder cam ring 301 rotates about its rotation axis. A finder magnification-changing cam, not shown, is provided on the periphery of the finder cam ring 301, and a cam pin 302a protruding from the objective lens 302 is in contact with the finder magnification-changing cam, whereby the objective lens 302 is moved in the direction of the optical axis, following the profile of the cam along with rotation of the finder cam ring 301 to zoom an image in the view finder.

Further, a gear 301a is provided at an end of the finder cam ring 301, and the gear 301a meshes with a gear 401a provided at an end of the strobe cam ring 401. With this arrangement, when the finder cam ring 301 rotates, the strobe cam ring 401 rotates about its rotation axis in a manner interlocked with the rotation of the finder cam ring 301. The strobe cam ring 401 has a strobe illumination angle-changing cam, not shown, formed on the outer periphery thereof, and a cam pin 402a protruding from a base member of a strobe flash section 402 is in contact with the strobe illumination angle-changing cam. With this arrangement, the strobe flash section 402 is moved in the direction of the optical axis, following the cam profile of the strobe illumination angle-changing cam along with rotation of the strobe cam ring 401, to thereby vary the angle of illumination with strobe light.

However, in the construction of the conventional linkage mechanism shown in FIG. 26, the rotation of the zoom lens barrel unit is transmitted to the finder cam ring 301 via the transmission gear train 201, and hence the influence of play due to backlash of the gears is large, which makes it difficult to control the position of the objective lens 302 and that of the strobe flash section 402 with high accuracy. Further, it is necessary to reduce the rotational speed of the zoom lens barrel unit in transmitting the rotation to the finder cam ring 301, and hence it is necessary to provide a plurality of gears including the transmission gear train 201. As a result, the construction of a drive mechanism for driving the objective lens 302 and the strobe flash section 402 becomes complicated, which makes it difficult to reduce the size of the camera. Further, it is necessary to incorporate the finder magnification-changing cam and the strobe illumination angle-changing cam in a state in phase with each other, which makes it very difficult to assemble the camera.

Further, a camera provided with a zoom finder device which changes the magnification of a finder optical system in a manner interlocked with the zooming motion of the zoom lens is disclosed in Japanese Laid-Open Patent Publication (Kokai) No. 2004-145044.

A description will be given of the zoom finder device with reference to FIGS. 27 and 28. FIG. 27 is a cross-sectional view showing a drive mechanism of the conventional zoom finder device, and FIG. 28 is a developed view of a cam ring appearing in FIG. 27.

As shown in FIG. 27, the camera has a drive gear 501 to which the rotation of a zoom motor, not shown, for causing the zoom lens to perform a zooming operation, is transmitted via a gear system. The drive gear 501 meshes with an inner peripheral gear 601a formed on a drive ring 601, and the drive gear 501 drives the drive ring 601 for rotation. The drive ring 601 has an outer peripheral gear 601b formed in the outer peripheral surface of the drive ring 601, and the outer peripheral gear 601b meshes with a transmission gear 701 that transmits a driving force to the zoom finder device. The rotation of the transmission gear 701 is transmitted to the cam ring 702. That is, the driving force for the zooming operation is transmitted to the zoom finder device side.

The cam ring 702 has two objective lens cams 702a and 702b formed thereon as shown in FIG. 28. Cam pins 801 and 802 protruding from associated objective lenses, not shown, are abutted against the cams 702a and 702b. A finder base 901 holds the objective lenses in a manner they are movable in the direction of the optical axis. When the cam ring 702 is rotated, the objective lens are moved in the direction of the optical axis, following the cam profiles of the cams 702a and 702b, whereby an image viewed in the view finder can be zoomed. Moreover, the cams 702a and 702b are formed such that areas (circled area RWa, RWb, RTa, and RTb in FIG. 28) corresponding to WIDE (wide angle) ends and TELE (telephoto) ends have no slope, and hence they each can stably obtain a desired magnification position without being adversely affected by the backlash of the gears or the like.

However, in a path on the cam 702a from a magnification area which has a varying slope to the WIDE end or the TELE end having no slope, there are slope-transition points, and when the objective lens passes the slope-transition points during zooming, jitter of an image occurs.

To prevent jitter of an image from occurring, separate component parts are required for imparting a biasing force to the objective lens in an opposite direction to the direction of rotation when the objective lens passes the slope-transition points.

SUMMARY OF THE INVENTION

It is a first object of the present invention to provide a linkage mechanism between a zoom lens barrel unit and a zoom member which contributes to the reduction of the size of a camera, and which is capable of highly accurately controlling a function of the zoom member.

It is a second object of the present invention to provide a camera incorporating a linkage mechanism between a zoom lens barrel unit and an illumination range-changing device and between the zoom lens barrel unit and a zoom finder device which contributes to the reduction of the size of a camera, and which is capable of highly accurately controlling the light illumination range of the illumination range-changing device and the magnification of a finder optical system of the zoom finder device.

It is a third object of the present invention to provide a method of assembling an illumination range-changing device and a zoom finder device, which contributes to simplification of assembly of a camera.

To attain the first object, in a first aspect of the present invention, there is provided a linkage mechanism between a zoom lens barrel unit and a zoom member disposed outwardly of the zoom lens barrel unit and having a zoom mechanism, comprising a cam plate that is disposed for linear motion in a direction orthogonal to an optical axis of the zoom lens barrel unit, the linear motion of the cam plate changing a zoom state of the zoom member, a cam groove formed in an outer periphery of a drive ring disposed for rotation around the optical axis of the zoom lens barrel unit, and a linkage member having an engagement member that engages with the cam groove, the linkage member moving forward and backward in the direction of the optical axis as the engagement member moves following the cam groove along with rotation of the drive ring, thereby causing the cam plate to move linearly in the direction orthogonal to the optical axis of the zoom lens barrel unit, wherein the cam groove is provided with a dead area in which the motion of the linkage member is not caused by the rotation of the drive ring.

With the arrangement of the first aspect of the present invention, it is possible to reduce the size of a camera, and control a function of the zoom member with high accuracy and to prevent jitter of an image from occurring without providing separate component parts for the prevention.

Preferably, the cam plate has a cam groove formed therein, the linkage member is provided with a drive pin for engagement with the cam groove of the cam plate, and the cam plate linearly moves in the direction orthogonal to the optical axis of the zoom lens barrel unit in a manner interlocked with movement of the linkage member forward or backward in the direction of the optical axis.

Preferably, the drive ring forms a part of the zoom lens barrel unit, and is at least driven for rotation about the optical axis of the zoom lens barrel unit.

More preferably, the drive ring is driven for rotation about the optical axis of the zoom lens barrel unit without moving forward or backward in the direction of the optical axis of the zoom lens barrel unit.

Preferably, the drive ring moves forward or backward in the direction of the optical axis of the zoom lens barrel unit while being driven for rotation about the optical axis of the zoom lens barrel unit.

Preferably, a space is formed between the zoom lens barrel unit and the cam plate, and the linkage member is disposed in the space.

More preferably, the linkage member is disposed diagonally of an imaging screen of the zoom lens barrel unit.

Preferably, the dead area is formed at locations respectively corresponding to a wide angle end and a telephoto end of the zoom lens barrel unit, and the cam groove extends in the direction orthogonal to the optical axis of the zoom lens barrel unit in the dead area.

More preferably, the cam plate is provided with a cam groove for defining a profile of an objective lens cam for driving an objective lens contained in the finder optical system, and the cam groove has a slope that constantly changes.

To attain the second object, in a second aspect of the present invention, there is provided a camera incorporating a linkage mechanism between a zoom lens barrel unit and an illumination range-changing device that changes a range of illumination with illuminating light and between the zoom lens barrel unit and a zoom finder device that changes magnification of a finder optical system, wherein the linkage mechanism comprises a cam plate that is disposed for linear motion in a direction orthogonal to an optical axis of a zoom lens barrel unit, the linear motion of the cam plate changing the magnification of the finder optical system and the range of illumination with illuminating light by the illumination range-changing device, and a linkage member disposed to be movable forward and backward in a direction in the direction of the optical axis of the zoom lens barrel unit, and having an engagement member that engages with a cam groove formed in an outer periphery of a drive ring for driving the zoom lens barrel unit, the linkage member moving forward and backward in the direction of the optical axis as the engagement member moves following the cam groove along with rotation of the drive ring, thereby causing the cam plate to move linearly in the direction orthogonal to the optical axis of the zoom lens barrel unit.

With the arrangement of the second aspect of the present invention, it is possible to reduce the size of a camera, and control the light illumination range of the illumination range-changing device and the magnification of a finder optical system of the zoom finder, with high accuracy.

To attain the third object, in a third aspect of the present invention, there is provided a method of assembling an illumination range-changing device having a moving section that moves to change a range of illumination with illuminating light, and a zoom finder device having a lens group that moves to change magnification of a finder optical system, comprising a first step of assembling the illumination range-changing device and the zoom finder device to a base plate, and a second step of causing a cam plate that has a first cam groove formed therein for engaging with the lens group of the zoom finder device, and a second cam groove formed therein for engaging with the moving section of the illumination range-changing device, to slide with respect to the base plate, to thereby assemble the cam plate to the base plate, wherein the second step comprises a first sub-step of causing the lens group of the zoom finder device assembled to the base plate to be engaged with the first cam groove of the cam plate, in a first position outside a range of normal use of the zoom lens barrel unit, a second sub-step of causing the cam plate to slide with respect to the base plate from the first position to a second position which is within the range of normal use of the zoom lens barrel unit, and a third sub-step of causing the moving section of the illumination range-changing device to engage with the second cam groove of the cam plate in the second position, to thereby assemble the cam plate to the base plate.

With the arrangement of the third aspect of the present invention, assembly of a camera can be simplified.

Preferably, the base plate has a protrusion formed thereon in advance, and the cam plate has an engaging nail formed in advance thereon for engagement with the protrusion, and wherein in the second step, when the cam plate is slid with respect to the base plate from the first position to the second position, the engaging nail of the cam plate climbs over the protrusion of the base plate to be engaged with the protrusion, whereby the engagement between the engaging nail and protrusion prevents the cam plate from being detached from the base plate.

The above and other objects, features, and advantages of the present invention will become more apparent from the following detailed description taken in conjunction with the accompanying drawings.

DETAILED DESCRIPTION OF THE PREFERRED EMBODIMENTS

The present invention will now be described in detail below with reference to the drawings showing preferred embodiments thereof.

Figure 1:
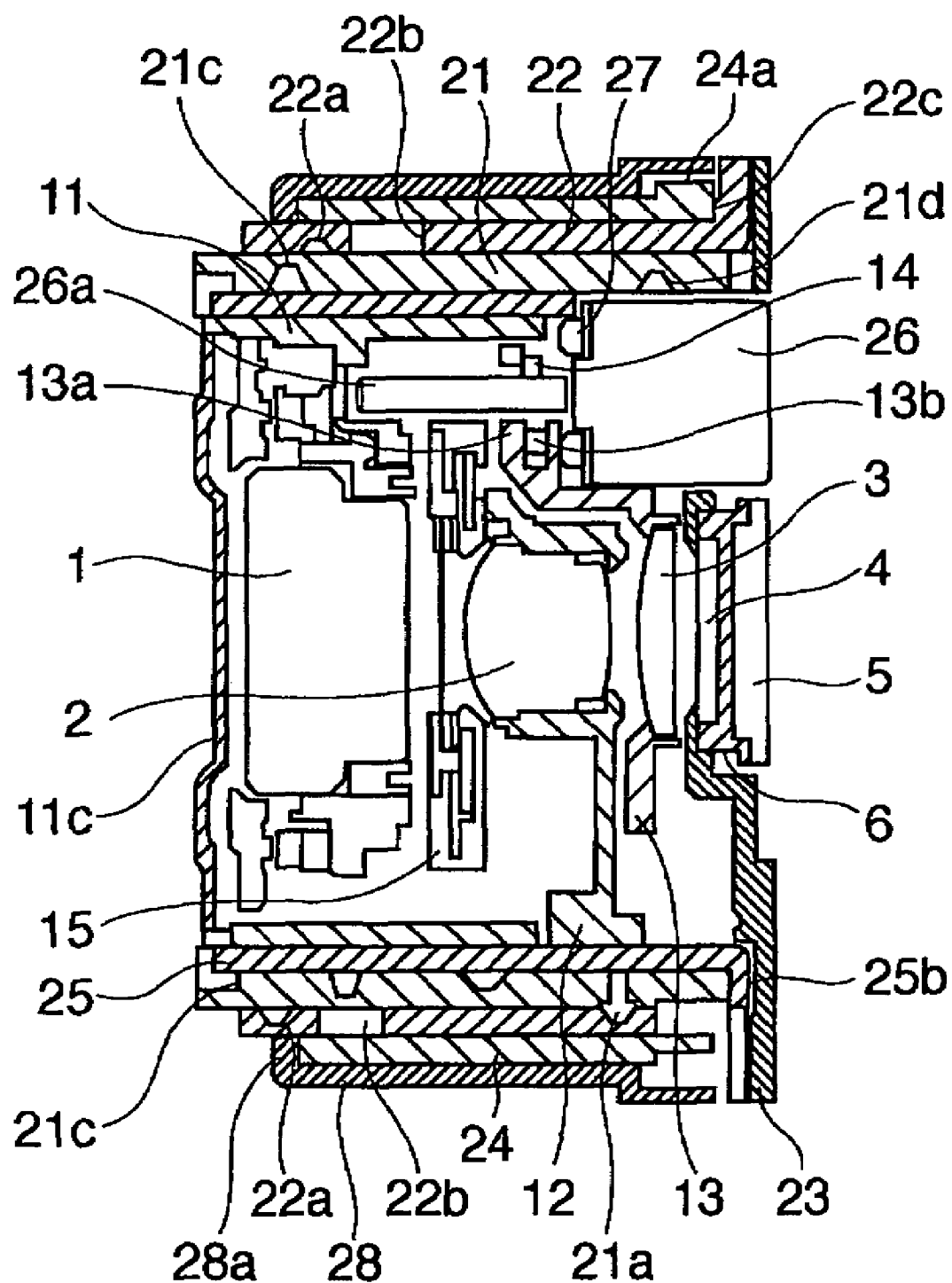
FIG. 1 is a longitudinal cross-sectional view of a lens barrel unit of a camera incorporating a linkage mechanism between a zoom strobe device and a zoom finder device, according to a first embodiment of the present invention.
Figure 2:
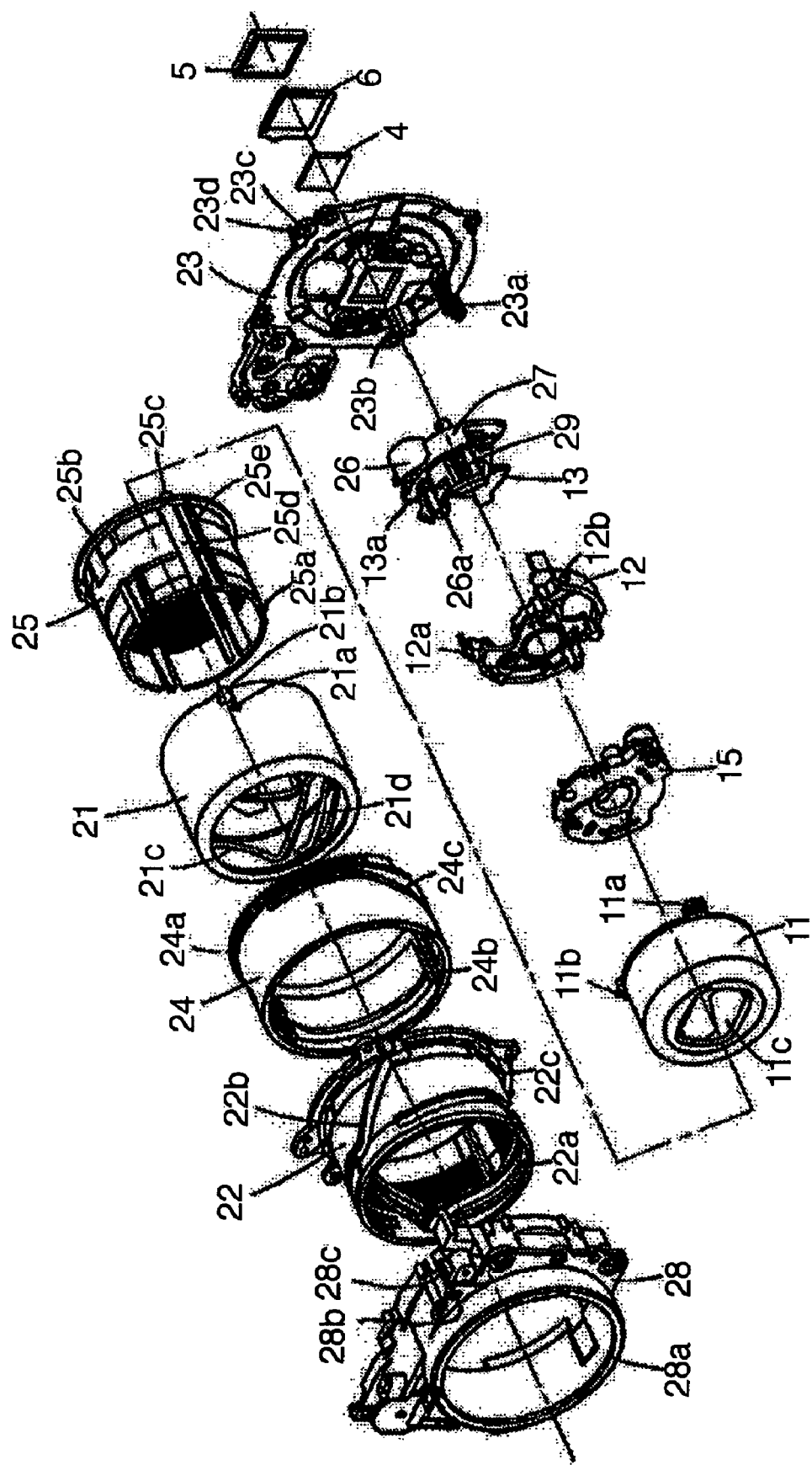
FIG. 2 is an exploded perspective view of the lens barrel unit in FIG. 1.

FIG. 1 is a longitudinal cross-sectional view of a lens barrel unit of a camera which incorporates a linkage mechanism between a zoom strobe device and a zoom finder device, according to a first embodiment of the present invention. FIG. 2 is an exploded perspective view of the lens barrel unit in FIG. 1.

As shown in FIGS. 1 and 2, the lens barrel unit is comprised of a first group barrel 11, a second group barrel 12, a third group barrel 13, a low-pass filter 4, a CCD 5, and a CCD rubber 6. The first group barrel 11 and the second group barrel 12 hold a first lens group 1 and a second lens group 2 (see FIG. 1) each providing a magnification effect (i.e. forming a zoom lens), respectively. The first group barrel 11 and second group barrel 12 are movable in the direction of an optical axis. The third group barrel 13 holds a third lens group 3 (see FIG. 1) that performs focus adjustment and image plane correction (i.e. forms a focus lens), and is movable in the direction of the optical axis.

The first group barrel 11 and the second group barrel 12 are held by a movable cam ring 21. The movable cam ring 21 has an inner surface formed with cam grooves 21c and 21d for holding the first group barrel 11 and the second group barrel 12, respectively. The movable cam ring 21 is movably held by a fixed barrel 22.

The fixed barrel 22 has an inner surface formed with three cam grooves 22a, and an outer surface formed with three guide grooves 22b extending through the fixed barrel 22 in the direction of thickness thereof. The fixed barrel 22 is fixed to a CCD holder 23 that holds the low-pass filter 4 and the CCD 5. The CCD rubber 6 seals a gap formed between the CCD holder 23 and the CCD 5 so as to prevent foreign matter or the like from being attached to an image pickup surface of the CCD 5.

The movable cam ring 21 is driven for rotation by a drive ring 24. The first group barrel 11 and the second group barrel 12 are moved in the direction of the optical axis while having respective rotations thereof restricted by a straight advance guide ring 25. The third group barrel 13 is driven by a focus motor 26 that is fixed to a third group cap 27. The third group cap 27 is fixed to the CCD holder 23. Further, a cover barrel 28 is fixed to the CCD holder 23. The cover barrel 28 is a member for restricting movement of the drive ring 24 in the direction of the optical axis, and has a finder base, described hereinafter, secured thereto.

The drive ring 24 is formed with an outer peripheral gear 24a which meshes with a gear train (not shown) for transmitting a driving force of a zoom motor (not shown). The drive ring 24 is driven for rotation by the driving force transmitted from the zoom motor to the outer peripheral gear 24a via the gear train. A front end of the drive ring 24 is in contact with a flange 28a formed on the cover barrel 28, and a rear end thereof is in contact with a flange 22c formed on a rear end of the fixed barrel 22, whereby the motion of the drive ring 24 in the direction of the optical axis is restricted. The drive ring 24 has an inner surface formed with three straight advance guide grooves 24b having a predetermined width and extending in the direction of the optical axis.

The movable cam ring 21 has an outer periphery formed with three follower pins 21a for being fitted in the three cam grooves 22a of the fixed barrel 22, respectively. The follower pins 21a are moved along the respective cam grooves 22a associated therewith according to the rotation of the movable cam ring 21. A drive pin 21b is formed at a location approximately rearward of each follower pin 21a on the outer periphery of the movable cam ring 21. The drive pins 21b extend through the three guide grooves 22b of the fixed barrel 22, for being slidably fitted in the straight advance guide grooves 24b in the drive ring 24, respectively. When the drive ring 24 is rotated, the rotation thereof is transmitted to the movable cam ring 21 via the drive pins 21b fitted in the straight advance guide grooves 24b, whereby the movable cam ring 21 is moved in the direction of the optical axis while being rotated along the cam grooves 22a of the fixed barrel 22.

A projection 25a is formed on a front side of an outer surface of the straight advance guide ring 25. The projection 25a is fitted in the cam groove 21c formed in the inner periphery of the movable cam ring 21. Further, a flange 25b is formed at a rear end of the straight advance guide ring 25. The flange 25b is in contact with a rear end of the movable cam ring 21, whereby the relative motion of the straight advance guide ring 25 with respect to the movable cam ring 21 in the direction of the optical axis is restricted. Further, a projection 25c is formed at a location on a rear side of the outer surface of the straight advance guide ring 25. The projection 25c is fitted in a straight advance guide (not shown) formed in an inner surface of the fixed barrel 22 such that the projection 25c can advance straight, whereby the rotation of the straight advance guide ring 25 about the optical axis is restricted. Therefore, when the movable cam ring 21 rotationally moves along the cam grooves 22a of the fixed barrel 22, the straight advance guide ring 25 moves only in the direction of the optical axis by following the motion of the movable cam ring 21 in the direction of the optical axis.

Formed in the outer surface of the straight advance guide ring 25 are straight advance guide grooves 25d and 25e having a predetermined width and extending in parallel with the optical axis. A guide 11a formed integrally with the first group barrel 11 is slidably fitted in the straight advance guide groove 25d, and a follower of the second group barrel 12 is slidably fitted in the straight advance guide groove 25e, whereby the rotations of the respective group barrels 11 and 12 are restricted. When the movable cam ring 21 moves, the group barrels 11 and 12 move in the direction of the optical axis without being rotated, which makes it possible to perform positioning of the lenses according to a desired focal length. Further, respective followers of the group barrels 11 and 12 are fitted in the cam grooves 21c and 21d of the movable cam ring 21, respectively. Now, the follower of the first group barrel 11, fitted in the cam groove 21c, is comprised of three follower pins 11b provided on the first group barrel 11. The follower of the second group barrel 12, fitted in the cam groove 21d, is comprised of two followers 12a formed integrally with the second group barrel 12, and a movable follower 12b urged by a spring toward the cam groove 21d.

The first group barrel 11 is provided with a known lens barrier mechanism 11c. The lens barrier mechanism 11c blocks an optical path of a photographic optical system when the first group barrel 11 is in a collapsed position, by a cam member 23a mounted to the CCD holder 23. A known aperture shutter unit 15 is fixed to the second group barrel 12, and moves in the direction of the optical axis in unison with the second group barrel 12.

Figure 3:
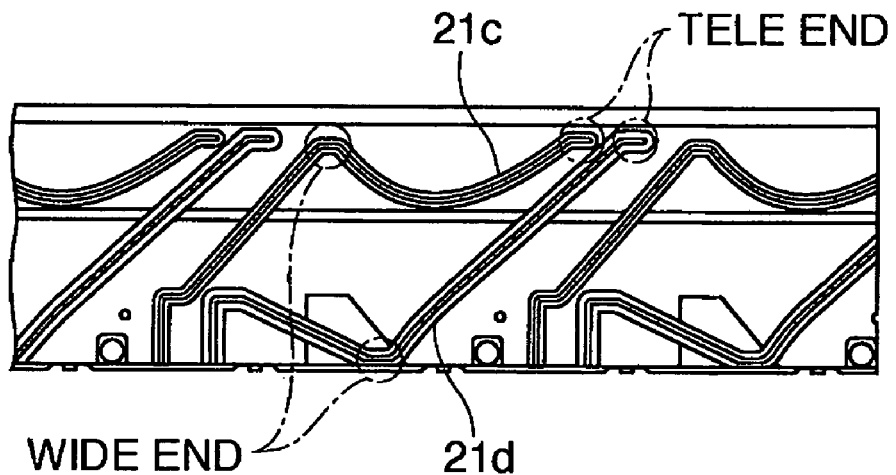
FIG. 3 is an unfolded view of the inside of a movable cam ring appearing in FIG. 2.

Next, shapes of the cam grooves 21c and 21d of the movable cam ring 21 will be described with reference to FIG. 3. FIG. 3 is an unfolded view of the inside of the movable cam ring appearing in FIG. 2.

As shown in FIG. 3, in the movable cam ring 21, the cam groove 21c associated with the first group barrel 11, and the cam groove 21d associated with the second group barrel 12 are formed such that each of the cam grooves includes those areas which are respectively associated with a WIDE end (wide angle end) and a TELE end (telephoto end) and which do not have a slope. Therefore, the group barrels 11 and 12 are positioned such that they can always stably provide a desired focal length in their WIDE end and TELE end positions without being adversely affected by play of the lens barrel unit.

Next, a description will be given of the driving of the third lens group (focus lens) 3.

As described above, the third lens group 3 is held by the third group barrel 13, and the third group barrel 13 is slidably held by a main guide bar 29 (see FIG. 2) disposed in parallel with the optical axis. One end of the main guide bar 29 is fixed to the CCD holder 23, and the other end thereof is positioned by the third group cap 27. In association with the main guide bar 29, a sub guide bar 23b is provided on the CCD holder 23 such that the sub guide bar 23b is located on a side approximately opposite from the main guide bar 29 with respect to the optical axis. A detent (not shown) of the third group barrel 13 is slidably fitted on the sub guide bar 23b. Furthermore, a nut-receiving portion 13a having a general C shape in cross section is disposed at a location in the vicinity of the main guide bar 29 of the third group barrel 13. A nut 14 screwed into a feed screw portion 26a of a focus motor 26 is placed in a C-shaped gap of the nut-receiving portion 13a and the rotation of the nut 14 is restricted by a detent 13b (see FIG. 1). When the focus motor 26 is driven, the nut 14 inhibited from rotation is moved toward the feed screw portion.

Figure 4:
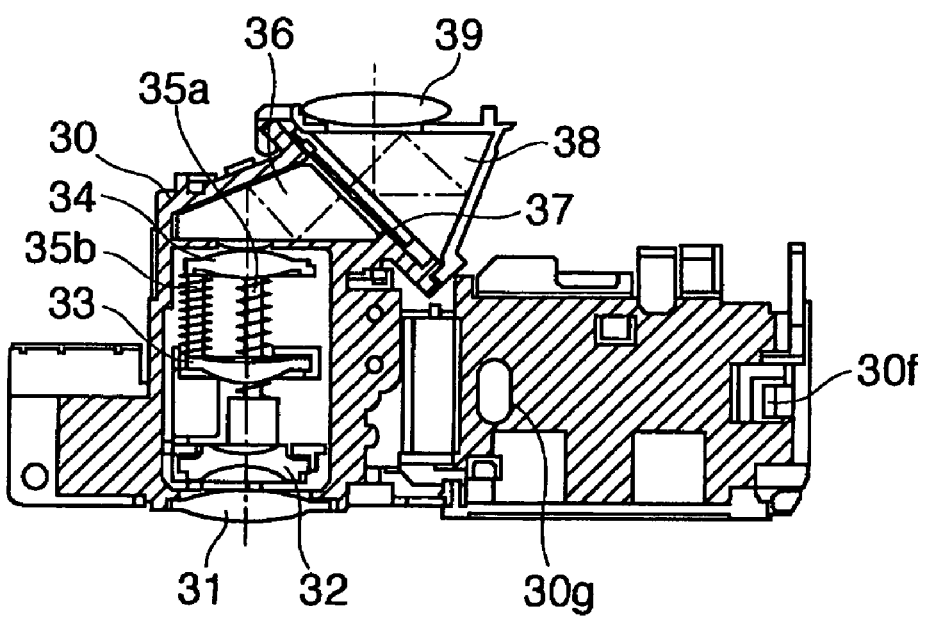
FIG. 4 is a horizontal cross-sectional view of a zoom finder taken along an optical axis thereof.
Figure 5:
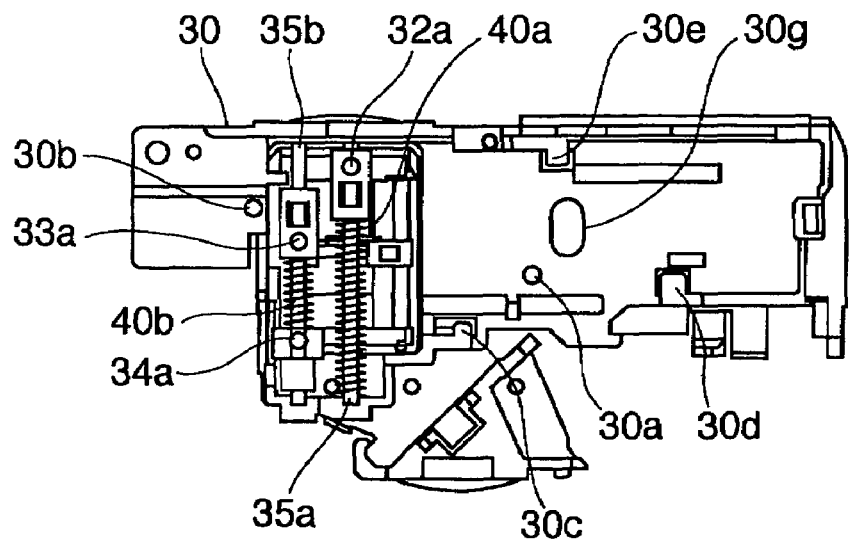
FIG. 5 is a bottom view of the zoom finder device.
Figure 6:
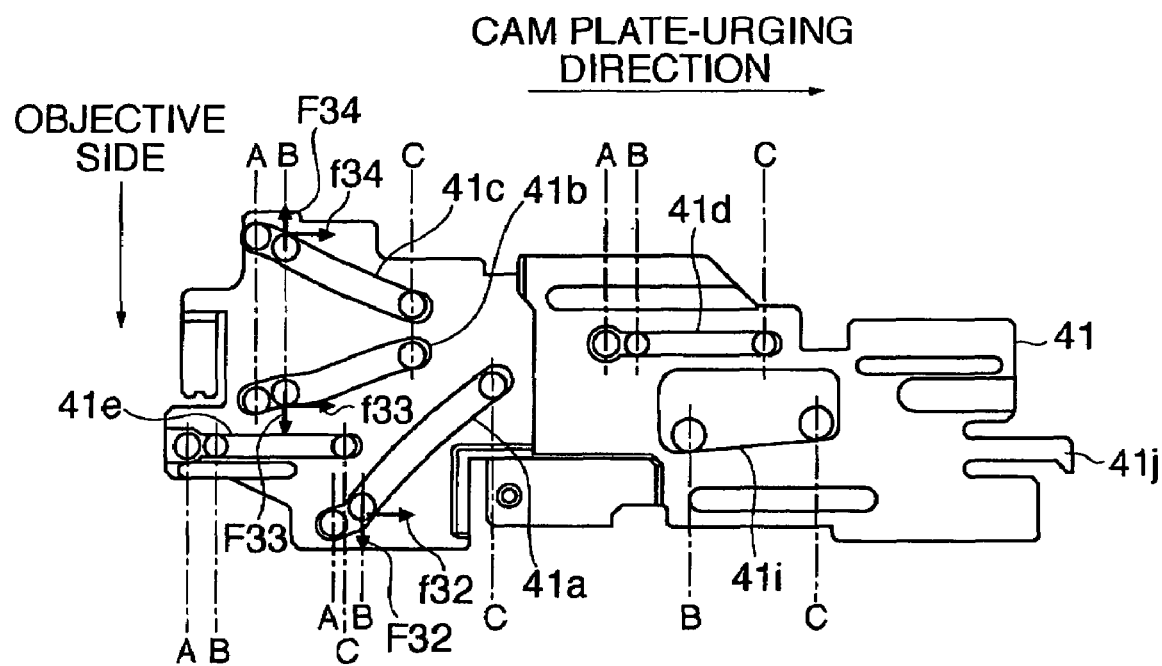
FIG. 6 is a top view of a cam plate.
Figure 7:
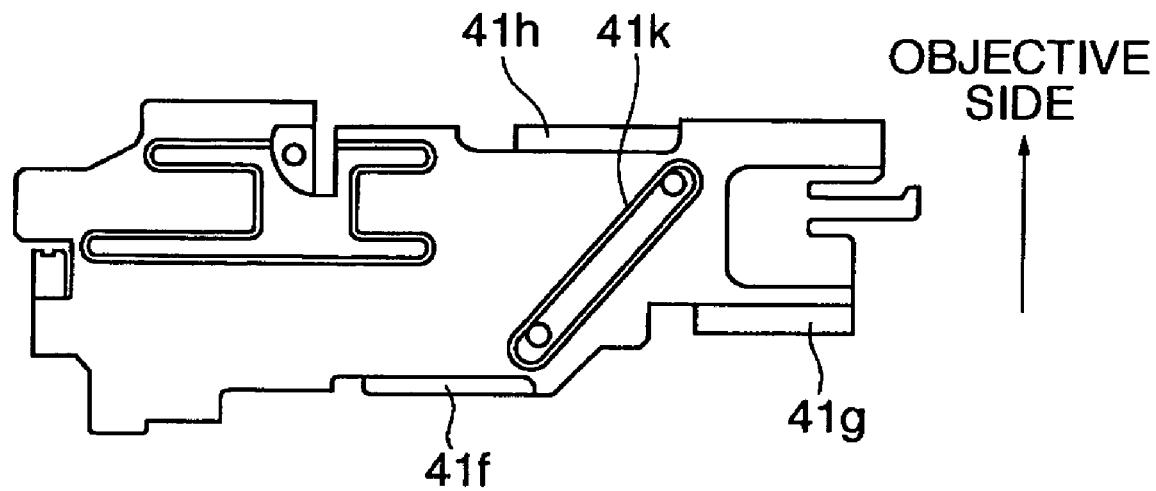
FIG. 7 is a bottom view of the cam plate.

The camera according to the present embodiment incorporates the zoom finder device which varies the magnification of a finder optical system in a manner interlocked with the zooming operation of the first lens group 1 and the second lens group 2. Now, the zoom finder device will be described with reference to FIGS. 4 to 7. FIG. 4 is a horizontal cross-sectional view of the zoom finder taken along the optical axis thereof. FIG. 5 is a bottom view of the zoom finder device. FIG. 6 is a top view of a cam plate. FIG. 7 is a bottom view of the cam plate.

As shown in FIG. 4 or 5, the zoom finder device is comprised of a finder base 30, a plurality of objective G1 to G4 lenses 31 to 34, a prism 36, a roof prism 38, and an eyepiece 39. The objective G1 lens 31 is fixed to the finder base 30. When light from an object enters the objective G1 lens 31, the incident light is sequentially refracted by the objective G2 lens 32 to G4 lens 34, and then enters the prism 36. In the prism 36, the light is reflected by reflection surfaces of the prism 36, and once formed into an image on a surface 37 defined by a view frame. The light of the formed image is sequentially reflected within the roof prism 38, and then enters photographer's eyes via the eyepiece 39.

The objective G2 lens 32, the objective G3 lens 33, and the objective G4 lens 34 are configured to be movable in the direction of the optical axis along two guide bars 35a and 35b and a guide groove (not shown) formed in the finder base 30, which serves as a detent. The objective G2 lens 32 is supported by the guide bar 35a on which is inserted a compression spring 40a. The compression spring 40a is disposed in a manner sandwiched between the objective G2 lens 32 and an abutment portion of the finder base 30. The compression spring 40a applies load onto the objective G2 lens 32 toward the object, thereby biasing the objective G2 lens 32. By the biasing load of the compression spring 40a, a cam pin 32a protruding from the objective G2 lens 32 is abutted against an object-side surface of a cam groove 41a formed on a cam plate 41 shown in FIG. 6. This causes the objective G2 lens 32 to move in the direction of the optical axis, following a cam profile defined by the cam groove 41a.

The objective G3 lens 33 and the objective G4 lens 34 are supported by the guide bar 35b onto which is inserted a compression spring 40b. The compression spring 40b is disposed in a manner sandwiched between the two objective G3 and G4 lenses 33 and 34. The compression spring 40b biases the objective G3 lens 33 and the objective G4 lens 34 toward an objective side and an eyepiece side, respectively. By the biasing load of the compression spring 40b, a cam pin 33a protruding from the objective G3 lens 33 is abutted against an object-side surface of a cam groove 41b formed in the cam plate 41 shown in FIG. 6, and a cam pin 34a protruding from the objective G4 lens 34 is abutted against an eyepiece-side surface of a cam groove 41c formed in the cam plate 41 shown in FIG. 6. This causes the objective G3 lens 33 and the objective G4 lens 34 to move in the direction of the optical axis, following cam profiles defined by the cam grooves 41b and 41c, respectively.

Referring to FIG. 6, two straight advance guide grooves 41d and 41e extending in the longitudinal direction of the cam plate 41 are formed on an upper surface of the cam plate 41. Two guide pins 30a and 30b protruding from a bottom surface of the finder base 30 are slidably fitted in the straight advance guide grooves 41d and 41e, respectively. This restricts the movement of the cam plate 41 in the direction of the optical axis, and enables the linear movement of the cam plate 41 in the left-right direction orthogonal to the optical axis. In FIG. 6, the symbols A, B, and C represent an assembling position, a WIDE position, and a TELE position, respectively.

As shown in FIG. 7, a plurality of engagement sliding portions 41f, 41g, and 41h are formed on a lower surface of the cam plate 41. The engagement sliding portions 41f, 41g, and 41h are engaged with engagement projections 30c, 30d, and 30e of the finder base 30, respectively. This prevents the cam plate 41 from dropping when the cam plate 41 moves in the left-right direction orthogonal to the optical axis.

In the zoom finder device configured as above, when the cam plate 41 is moved by a linkage member, described hereinafter, in the left-right direction orthogonal to the optical axis, the objective lenses 32 to 34 move in the direction of the optical axis, following the cam grooves 41a, 41b, and 41c, which makes it possible to zoom a finder image.

Figure 8:
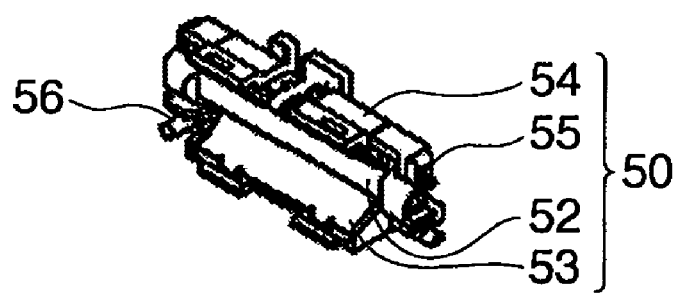
FIG. 8 is a perspective view of a zoom strobe device assembled to the zoom finder device.
Figure 9:
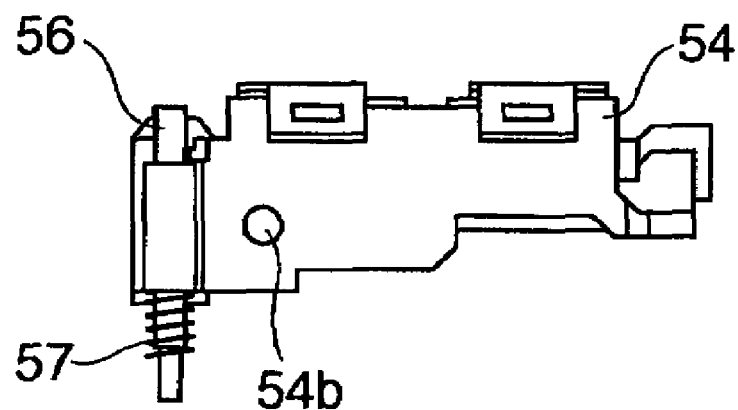
FIG. 9 is a bottom view of the zoom strobe device in FIG. 8.
Figure 10:
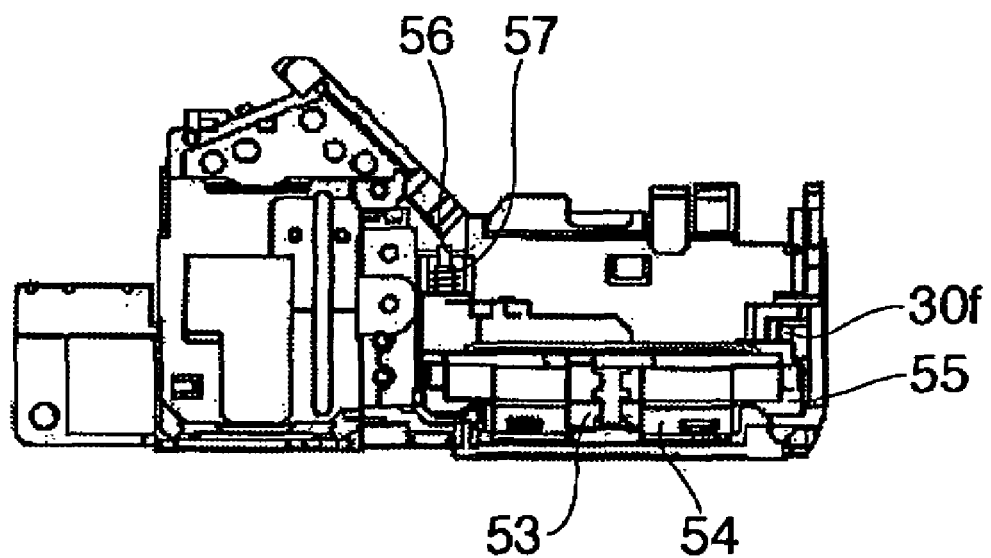
FIG. 10 is a top view of the zoom strobe device assembled to a finder base.
Figure 11:
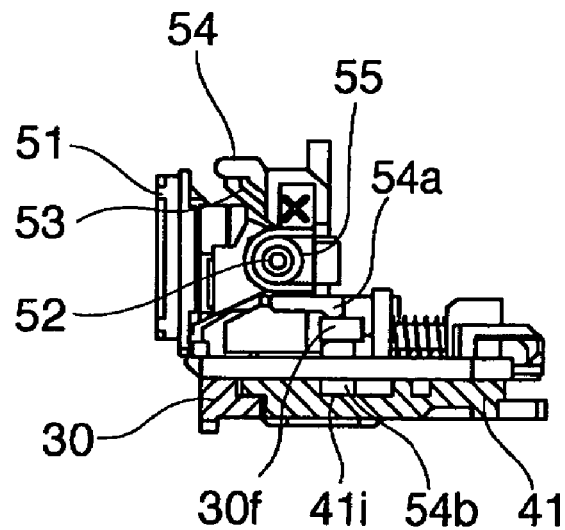
FIG. 11 is a right side view of the zoom strobe device in WIDE position.

The above-described zoom finder device has the zoom strobe device integrally incorporated therein. Hereinafter, the zoom strobe device will be described with reference to FIGS. 8 to 11. FIG. 8 is a perspective view of the zoom strobe device assembled to the zoom finder device. FIG. 9 is a bottom view of the zoom strobe device in FIG. 8. FIG. 10 is a top view of the zoom strobe device assembled to the finder base. FIG. 11 is a right side view of the zoom strobe device in WIDE position. In FIG. 11, for ease of understanding, the finder base 30 and the cam plate 41 are shown in cross section.

Referring to FIG. 8, the zoom strobe device 50 is comprised of a panel (indicated by reference numeral 51 in FIG. 11), a xenon tube 52, a light reflector 53, a strobe-holding member 54, and a presser rubber 55. The panel 51 has the function of collecting or diffusing light emitted from a light source, and is fixed to the finder base 30. The xenon tube 52 is connected to power supply via a lead wire (not shown) and serves as the light source for illuminating an object. The light reflector 53 is a reflecting member for reflecting light emitted from the xenon tube 52 to guide the light toward the front of the camera. The presser rubber 55 is a member for pressing the xenon tube 52 against the light reflector 53. The xenon tube 52, the light reflector 53, and the presser rubber 55 are incorporated in the strobe-holding member 54.

The zoom strobe device 50 is slidably held by a main guide bar 56 (see FIG. 10) supported by the finder base 30. As shown in FIG. 10, a sub guide bar 30f is formed at a location approximately opposite from the main guide bar 56 of the finder base 30. A detent 54a of the strobe-holding member 54 is slidably fitted in the sub guide bar 30f. A compression spring 57 is fitted on the main guide bar 56 in a manner sandwiched between the strobe-holding member 54 and the abutment portion of the finder base 30 (see FIGS. 9 and 10). The compression spring 57 applies load onto the strobe-holding member 54 toward the front of the camera to bias the strobe-holding member 54. As shown in FIG. 11, by the biasing load of the compression spring 57, a cam pin 54b (see FIG. 9) protruding from a lower surface of the strobe-holding member 54 is abutted against a camera front-side surface of a cam groove 41i (see FIG. 6) formed in the cam plate 41, through a through hole 30g (see FIG. 5) of the finder base 30.

In the zoom strobe device 50 configured as above, when the cam plate 41 moves, the strobe-holding member 54 having the xenon tube 52 and the light reflector 53 incorporated therein moves forward and backward in the direction of the optical axis, following the shape of the cam groove 41i. The distances between the xenon tube 52 and the panel 51 and between the light reflector 53 and the panel 51 are changed in accordance with the forward/backward movement of the cam plate 41, which changes the angle of illumination with strobe light. Thus, the angle of illumination with strobe light is changed in a manner interlocked with the zooming operation of the first group barrel 11 the second group barrel 12 (rotation of the drive ring 24).

Figure 12:
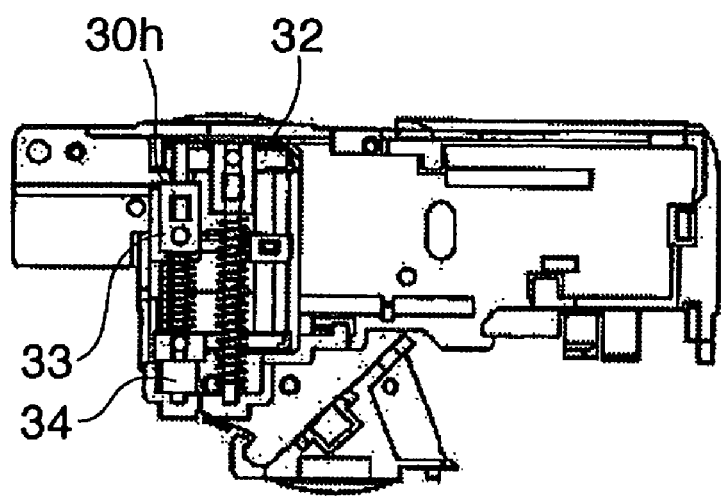
FIG. 12 is a bottom view of the zoom finder device.
Figure 13:
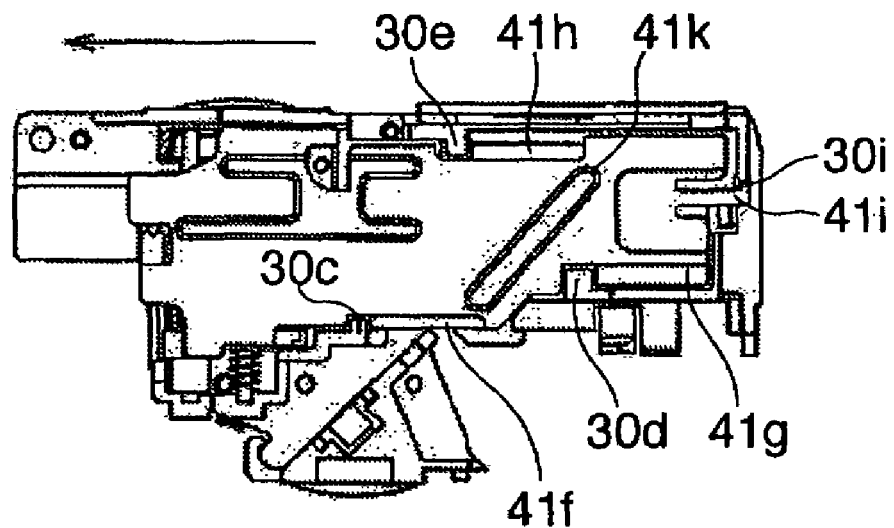
FIG. 13 is a bottom view of the cam plate assembled to the zoom finder device (in assembling position)
Figure 14:
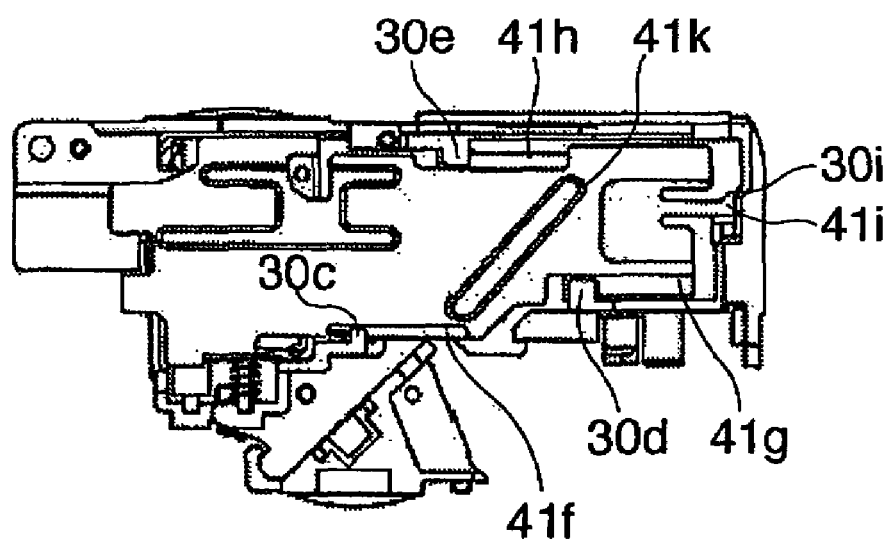
FIG. 14 is a bottom view of the cam plate assembled to the finder base up to a position in which it cannot be dropped from the finder base.
Figure 15:
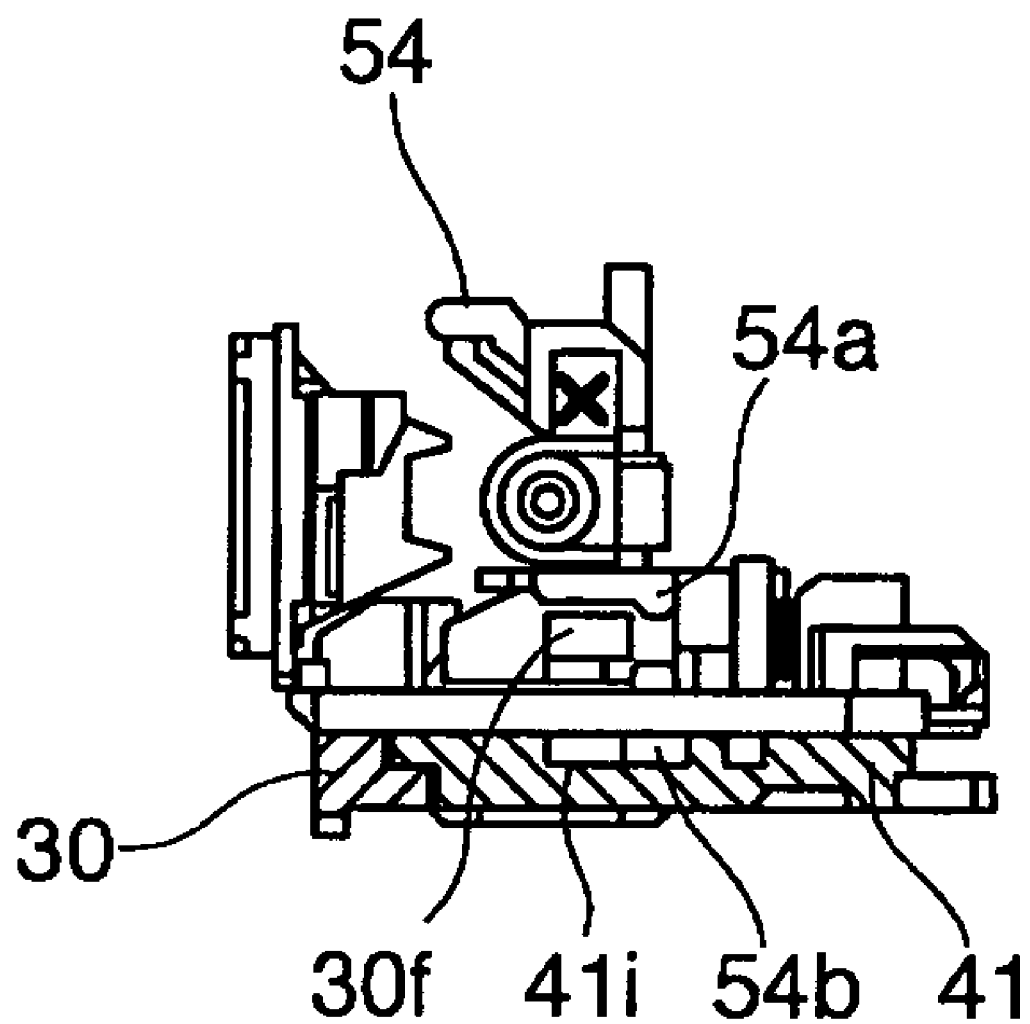
FIG. 15 is a right side view of the zoom strobe device assembled to the finder base.

Next, the arrangement in which the zoom strobe device 50 is assembled in the zoom finder device will be described with reference to FIGS. 12 to 15. FIG. 12 is a bottom view of the zoom finder device, which shows a state of the zoom finder device before the cam plate 41 is assembled thereto although the objective lenses have already been assembled thereto. FIG. 13 is a bottom view of the cam plate assembled to the zoom finder device (in assembling position). FIG. 14 is a bottom view of the cam plate assembled to the finder base up to a position where it cannot be dropped from the same. FIG. 15 is a right side view of the zoom strobe device assembled to the finder base.

The objective G2 lens 32 and the objective G3 lens 33 are urged toward the objective side by the compression spring 40a, and the objective G4 lens 34 toward the eyepiece side by the compression spring 40b (see FIG. 5). As shown in FIG. 12, this brings the objective G2 lens 32 into fixed abutment with an objective-side abutment surface of the finder base 30, the objective G3 lens 33 into fixed abutment with a projection 30h formed on the finder base 30, and the objective G4 lens 34 into fixed abutment with an eyepiece-side abutment surface of the finder base 30. This assembling position corresponds to the assembling position A (first position) in the top view of the cam plate in FIG. 6. As shown in FIG. 6, in the assembling position, the cam plate 41 can be easily assembled to the zoom finder device, since the widths of the cam grooves 41a to 41c for the objective G2 to G4 lenses 32 to 34, and the widths of the two straight advance guide grooves 41d and 41e are formed to be larger than the respective diameters of the associated pins.

Referring to FIG. 13, in a state in which the cam pins 32a, 33a, and 34a of the respective objective G2 to G4 lenses 32 to 34, and the guide pins 30a and 30b of the finder base 30 are inserted into the above-described cam grooves 41a, 41b, 41c, 41d, and 41e, the engagement sliding portions 41f, 41g, and 41h of the cam plate 41 do not coincide with the engagement projections 30c, 30d, and 30e of the finder base 30, and hence the cam plate 41 is in a state in which it can be dropped from the finder base. From this state, when the cam plate 41 is moved in a direction indicated by an arrow in FIG. 13, and the cam plate 41 is assembled to a position where an engagement nail 41j protruding from the cam plate 41 climbs over an engagement portion 30i of the finder base 30, the engagement sliding portions 41f, 41g, and 41h of the cam plate 41 coincide with the respective engagement projections 30c, 30d, and 30e of the finder base 30 for engagement therewith, as shown in FIG. 14, the cam plate 41 is placed in a state in which it cannot be dropped from the finder base. FIG. 14 shows the state in which the cam plate 41 is in WIDE position.

Now, when the cam plate 41 is assembled to the finder base 30, and the cam pins 32a, 33a, and 34a of the objective G2 to G4 lenses 32 to 34 are engaged with the associated cam grooves 41a, 41b, and 41c, the objective G2 lens 32 and the objective G3 lens 33 are urged toward the objective side, and the objective G4 lens 34 toward the eyepiece side. Therefore, urging forces F32, F33, and F34 act on the cam plate 41, as shown in FIG. 6. At this time, based on the relationship between the directions of forces in which the cam pins 32a, 33a, and 34a press the cam grooves 41a, 41b, and 41c, and the slopes of the cam grooves 41a, 41b, and 41c, respective components f32, f33, and f34 of the forces F32, F33, and F34 act such that the cam plate 41 is always urged rightward as viewed in FIG. 6. As a result, the cam plate 41 is fixed by urging force at a position where the engagement nail 41j is brought into contact with the engagement portion 30i of the finder base 30 (collapsed position). In collapsed position, the engagement sliding portions 41f, 41g, and 41h of the cam plate 41 are aligned with the respective engagement projections 30c, 30d, and 30e of the finder base 30 for engagement, and therefore the cam plate 41 cannot be dropped from the finder base. Here, the assembling position A (first position) is outside a region for use of the camera, whereas the collapsed position where the cam plate 41 is assembled to the finder base 30 and more inward positions are within the region for use of the camera.

As described above, with the arrangement of the present embodiment, it is possible to easily assemble the cam plate 41 to the finder base 30, and once the cam plate 41 is assembled to the finder base 30, the cam plate 41 cannot be detached from the finder base 30, since the cam plate 41 is fixed by urging force to the finder base 30.

Further, as shown in FIG. 15, that portion of the cam groove 41i which is utilized in actual use is on the front side of the cam plate 41, whereas a large area rearward of the above portion is formed as free space (see FIG. 6). This also applies to the through hole 30g of the finder base 30, in which a large area rearward of the through hole 30g is formed as free space (see FIG. 4). As a result, as shown in FIG. 15, the cam pin 54b protruding from the lower surface of the strobe-holding member 54 can also be inserted into the cam groove 41i through the through hole 30g, even when the cam plate 41 is in a position (assembling position A) rearward of the TELE position, where the detent 54a of the strobe-holding member 54 is not fitted on the sub guide bar 30f of the finder base 30. Therefore, when the zoom strobe device 50 (strobe-holding member 54) is assembled to the assembling position from the upper surface side of the finder base 30, and the main guide bar 56 and the compression spring 57 are assembled to the finder base 30, the zoom strobe device 50 (strobe-holding member 54) is urged forward by the compression spring 57 to fit the detent 54a on the sub guide bar 30f, whereby the zoom strobe device 50 (strobe-holding member 54) is fixed by the urging force at a position where the cam pin 54b is brought into contact with the cam groove 41i (see FIG. 11).

As described above, with the arrangement of the present embodiment, there is no need to carry out alignment between the zoom strobe device 50 and the cam plate 41 when the zoom strobe device 50 (strobe-holding member 54) is assembled to the zoom finder device. This makes it possible to easily assemble the zoom strobe device 50 to the zoom finder device. Further, since a large area rearward of the cam groove 41i is formed as free space, the relationship between the cam pin 54b and the cam groove 41i when the zoom strobe device 50 is in assembling position is held constant, irrespective of the position of the cam plate 41, whereby it is possible to assemble the zoom strobe device 50 to the zoom finder device no matter where the cam plate 41 is located.

Figure 16:
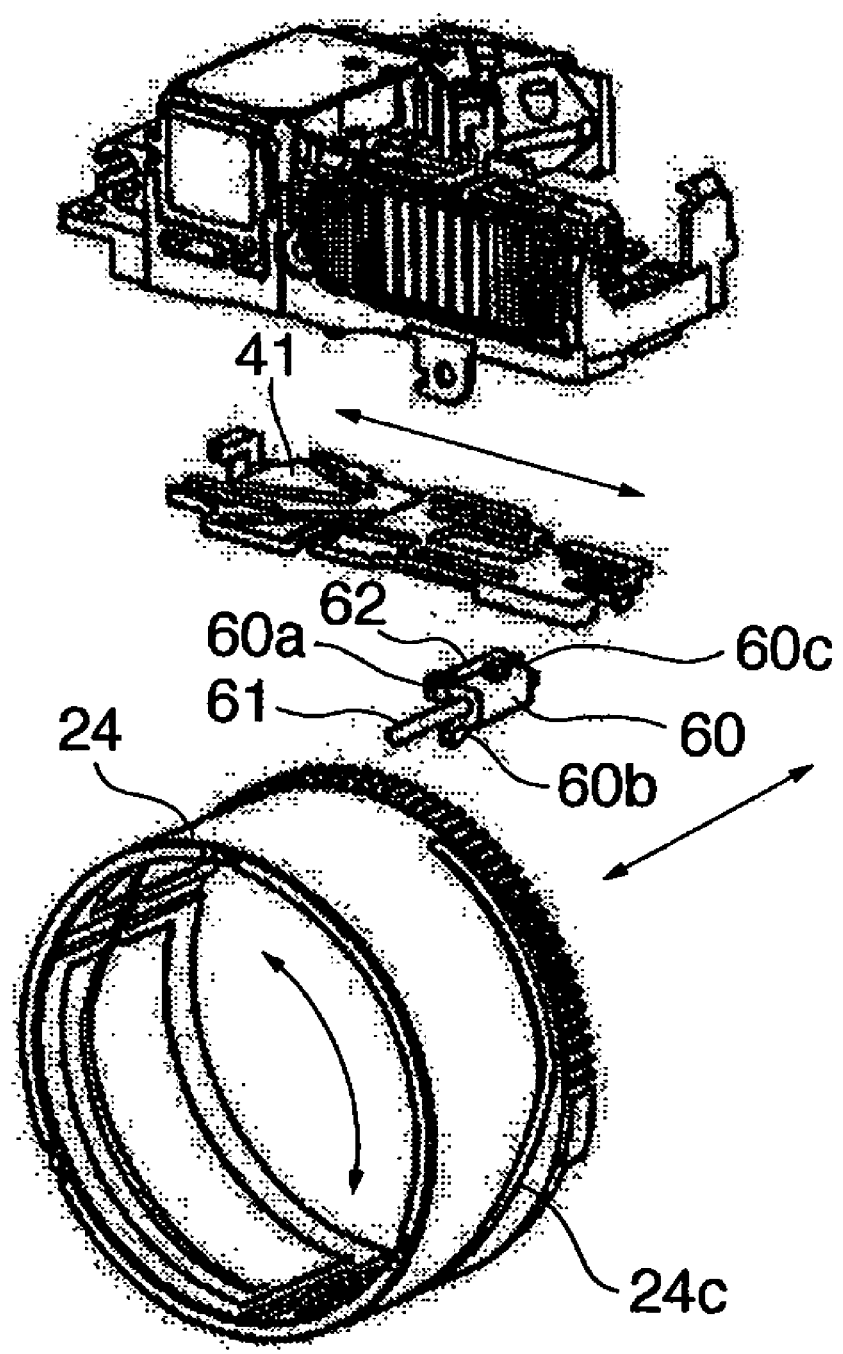
FIG. 16 is an exploded perspective view of the linkage mechanism that transmits a driving force from the lens barrel unit to the zoom finder device and the zoom strobe device.
Figure 17:
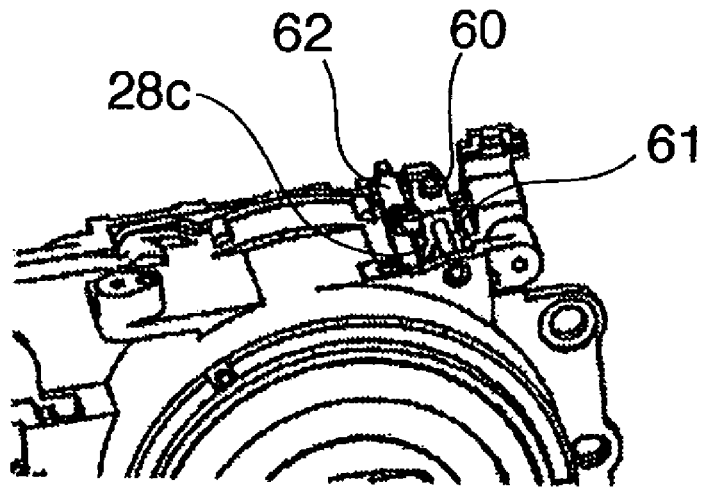
FIG. 17 is a fragmentary perspective view of details of part of the linkage mechanism in FIG. 16.
Figure 18:
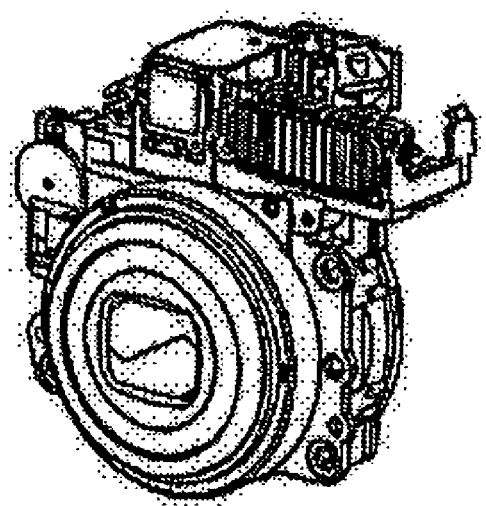
FIG. 18 is a perspective view of the finder base assembled to the lens barrel unit.
Figure 19:
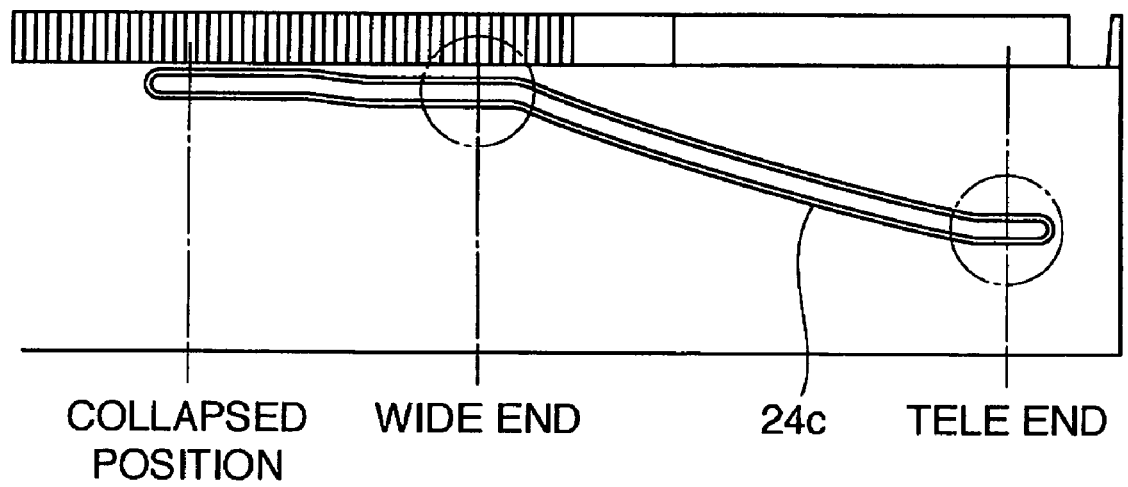
FIG. 19 is an unfolded view of the outer surface of the drive ring.
Figure 20:
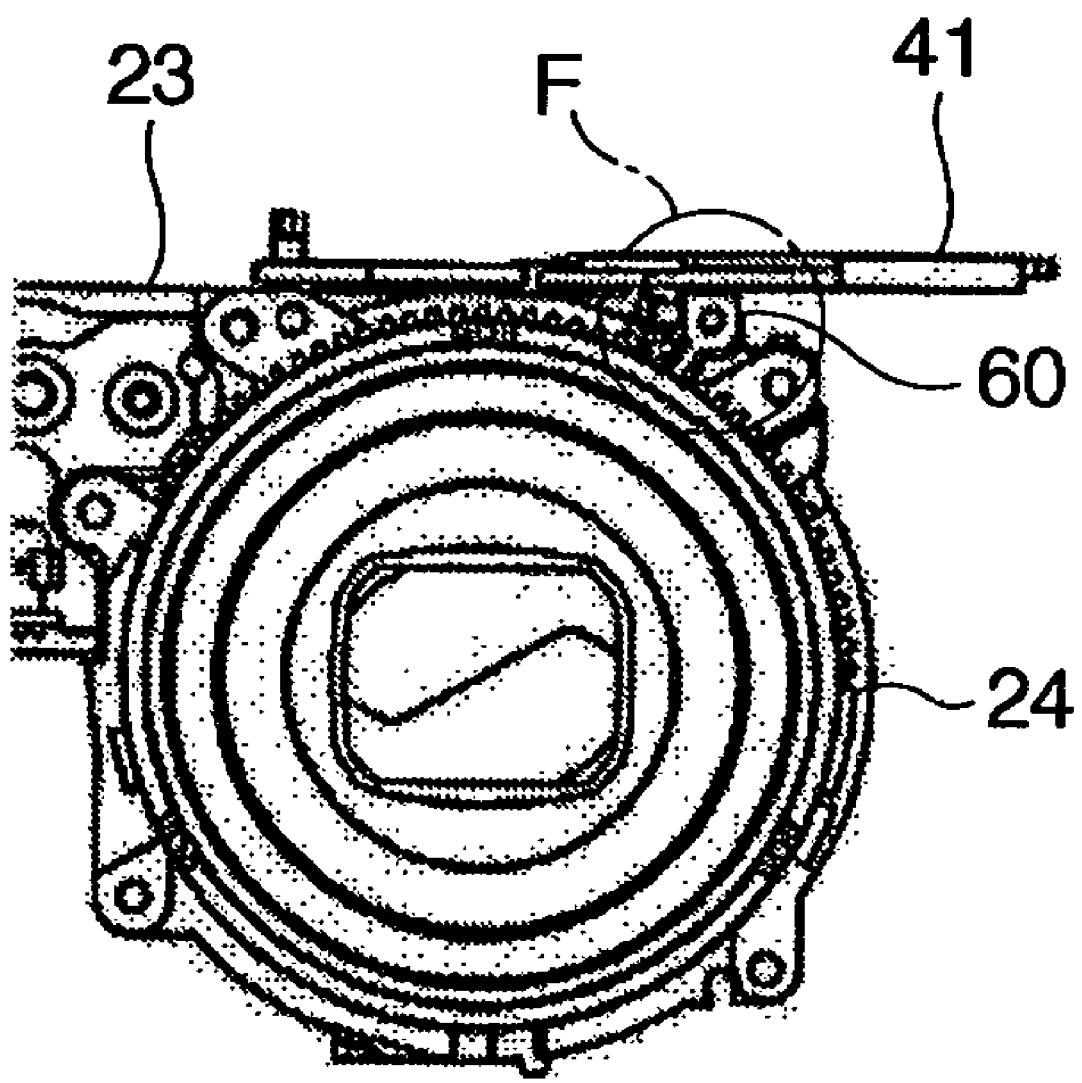
FIG. 20 is a fragmentary front view of the linkage mechanism in FIG. 16.

Next, the linkage mechanism that transmits a driving force from the lens barrel unit to the zoom finder device and the zoom strobe device will be described with reference to FIGS. 16 to 20. FIG. 16 is an exploded perspective view of the linkage mechanism that transmits a driving force from the lens barrel unit to the zoom finder device and the zoom strobe device. FIG. 17 is a fragmentary perspective view of details of part of the linkage mechanism in FIG. 16. FIG. 18 is a perspective view of the finder base assembled to the lens barrel unit. FIG. 19 is an unfolded view of the outer surface of the drive ring. FIG. 20 is a fragmentary front view of the linkage in FIG. 16.

As shown in FIG. 16, in the linkage mechanism that transmits a driving force from the lens barrel unit to the zoom finder device and the zoom strobe device, a linkage member 60 is provided which transmits the driving force from the drive ring 24 to the cam plate 41. The linkage member 60 is formed with an engaging portion 60a, a guide pin 60b extending obliquely downward from the linkage member 60, and a cam pin 60c. The linkage member 60 is slidably supported by a guide bar 61 which is supported between a groove 23c of the CCD holder 23 and a hole 28b of the cover barrel 28 (see FIG. 2). One end of a tension spring 62 is engaged with the engaging portion 60a of the linkage member 60, and the other end of the tension spring 62 is engaged with a hook 23d formed on the CCD holder 23 (see FIG. 2). The tension spring 62 urges the linkage member 60 toward the rear side of the camera.

The guide pin 60b of the linkage member 60 is slidably inserted into a guide groove 28c formed through the cover barrel 28 in the direction of thickness thereof. A distal end of the guide pin 60b is fitted in a cam groove 24c formed in an outer surface of the drive ring 24. This restricts rotation of the linkage member 60 about the guide bar 61, and the linkage member 60 is driven in the direction of the optical axis, following the cam groove 24c along with rotation of the drive ring 24. Here, as shown in FIG. 19, the cam groove 24c formed in the outer surface of the drive ring 24 is formed such that areas thereof associated with the WIDE end and the TELE end, respectively, are areas with no slopes (dead zones where the linkage member 60 is not driven even when the drive ring 24 rotates). The finder base 30 by which the cam plate 41 is held integrally therewith is fixed to the cover barrel 28, and the cam pin 60c formed on an upper surface of the linkage member 60 is fitted in a cam groove 41k formed in a bottom surface of the cam plate 41 (see FIG. 7).

As described hereinabove, in the straight advance guide grooves 41d and 41e of the cam plate 41 are slidably fitted the associated guide pins 30a and 30b of the finder base 30, respectively, which restricts the movement of the cam plate 41 in the direction of the optical axis, and enables the linear movement of the cam plate 41 in the left-right direction orthogonal to the optical axis. Therefore, when the linkage member 60 moves forward and backward in the direction of the optical axis in accordance with the rotation of the drive ring 24, the cam plate 41 performs the linear movement in the left-right direction orthogonal to the optical axis, following the cam groove 41k. Although in the present embodiment, the driving force is transmitted from the linkage member 60 to the cam plate 41 by the engagement between the cam pin 60c and the cam groove 41k, this is not limitative, but the drive mechanism may be configured such that the driving force is transmitted e.g. by gears and racks. However, when the driving force is transmitted by gears and racks, it is necessary to use a speed reduction mechanism. Therefore, it is sometimes difficult to convert the rotational movement of the drive ring 24 to the linear movement of the cam plate 41 in the left-right direction orthogonal to the optical axis via one linkage member.

Further, as shown in FIG. 20, the linkage member 60 is disposed within a space formed between the cam plate 41 and the zoom lens barrel unit. More specifically, the linkage member 60 is disposed within a space of an area F located approximately diagonally of an image pickup surface of the zoom lens barrel unit when the cam plate 41 is caused to come as close as possible to the zoom lens barrel unit, whereby it is possible to make effective use of the space, thereby attaining the reduction of the size of the camera.

As described above, in the present embodiment, the rotational movement of the lens barrel unit is converted to the linear movement of the cam plate 41 in the left-right direction orthogonal to the optical axis via one linkage member 60, whereby transmission of the driving force from the lens barrel unit to the zoom finder device and the zoom strobe device is attained. This makes it possible to reduce the number of component parts to thereby reduce the size of the camera, and further to simplify the linkage mechanism, thereby attaining high-accuracy position control of the cam plate 41. That is, it is possible to always stably obtain a desired magnifying position of the zoom finder device and a desired illumination angle (illumination range) of the zoom strobe device.

Further, those areas of the cam groove 24c of the drive ring 24 which correspond to the WIDE end and the TELE end, respectively, are areas with no slopes (dead zones). The dead zones inhibit the linkage member 60 from being moved to a position beyond the WIDE end or a position beyond the TELE end, even when the drive ring 24 is rotated to a position beyond the WIDE end or a position beyond the TELE end due to variations of rotational angles of the drive ring 24 caused by the play of the lens barrel unit. Therefore, the cam plate 41 driven by the linkage member 60 is not moved to a position beyond the WIDE end or a position beyond the TELE end, whereby it is possible to always stably obtain a desired magnifying position of the zoom finder device and a desired illumination angle (illumination range) of the zoom strobe device. Further, since the cam plate 41 is not moved to a position beyond the WIDE end or a position beyond the TELE end, conventionally required areas with no slopes are not provided in the cam grooves 41a, 41b, and 41c formed in the cam plate 41 in association with the respective objective G2 lens 32, G3 lens 33, and G4 lens 34 (see FIG. 6). Therefore, in the cam grooves for the objective lenses, there are no conventionally existing slope-transition points between magnification areas with constantly varying slopes and the areas with no slopes of the cam grooves. This makes it possible to prevent jitter of an image from being caused by the objective lens when the objective lens passes the slope-transition points.

As described above, according to the present embodiment, there is no need to form slope-transition points in the cam grooves 41a, 41b, and 41c for the objective lenses, and hence it is possible to cause the objective lenses to operate stably. Further, it is possible to dispense with separate component parts for obtaining a biasing force for preventing occurrence of jitter of an image, thereby making it possible to reduce the number of component parts of the camera.

Figure 21:
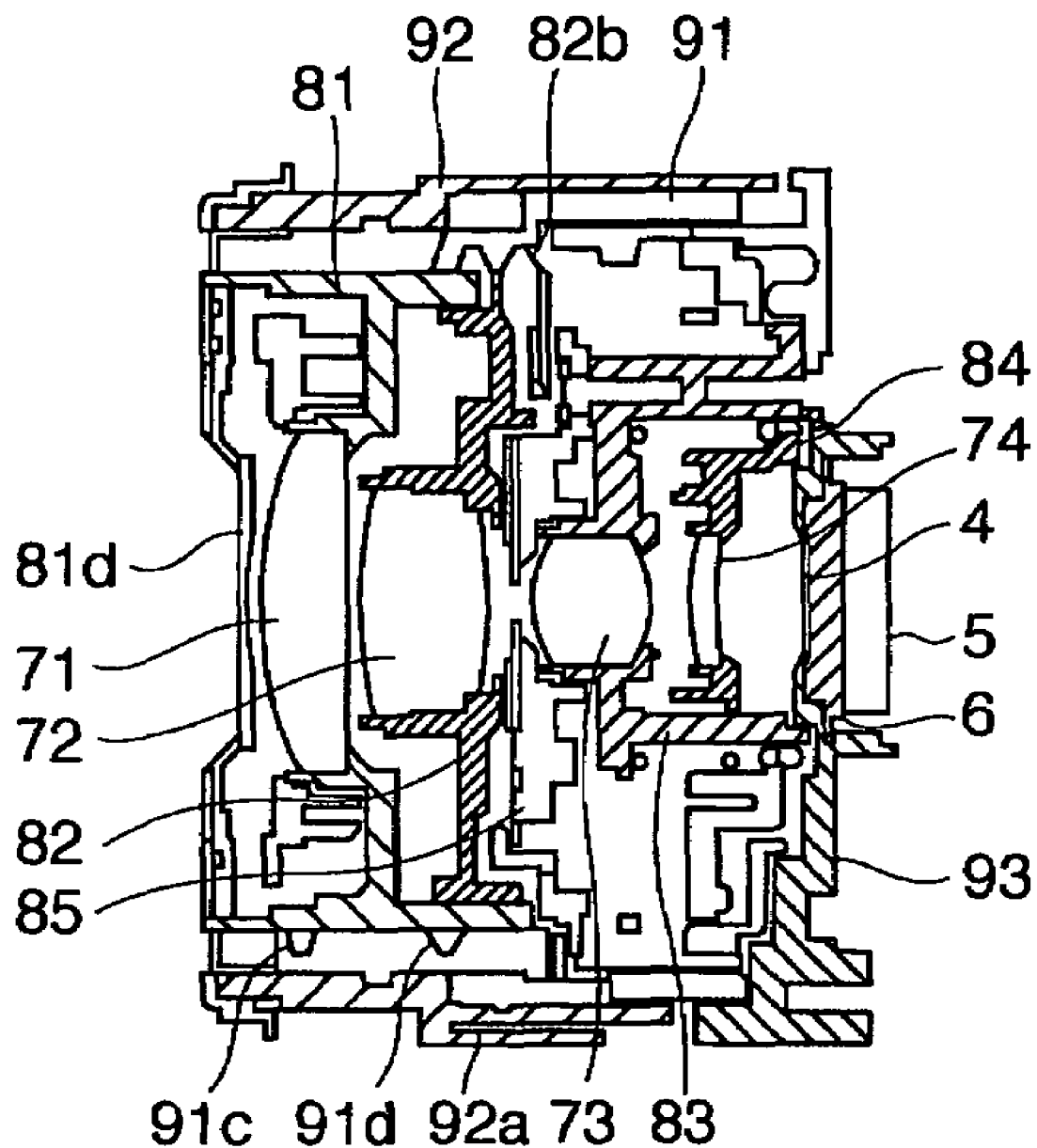
FIG. 21 is a longitudinal cross-sectional view of a lens barrel unit in a collapsed position of a camera incorporating a linkage mechanism between a zoom strobe device and a zoom finder device, according to a second embodiment of the present invention.
Figure 22:
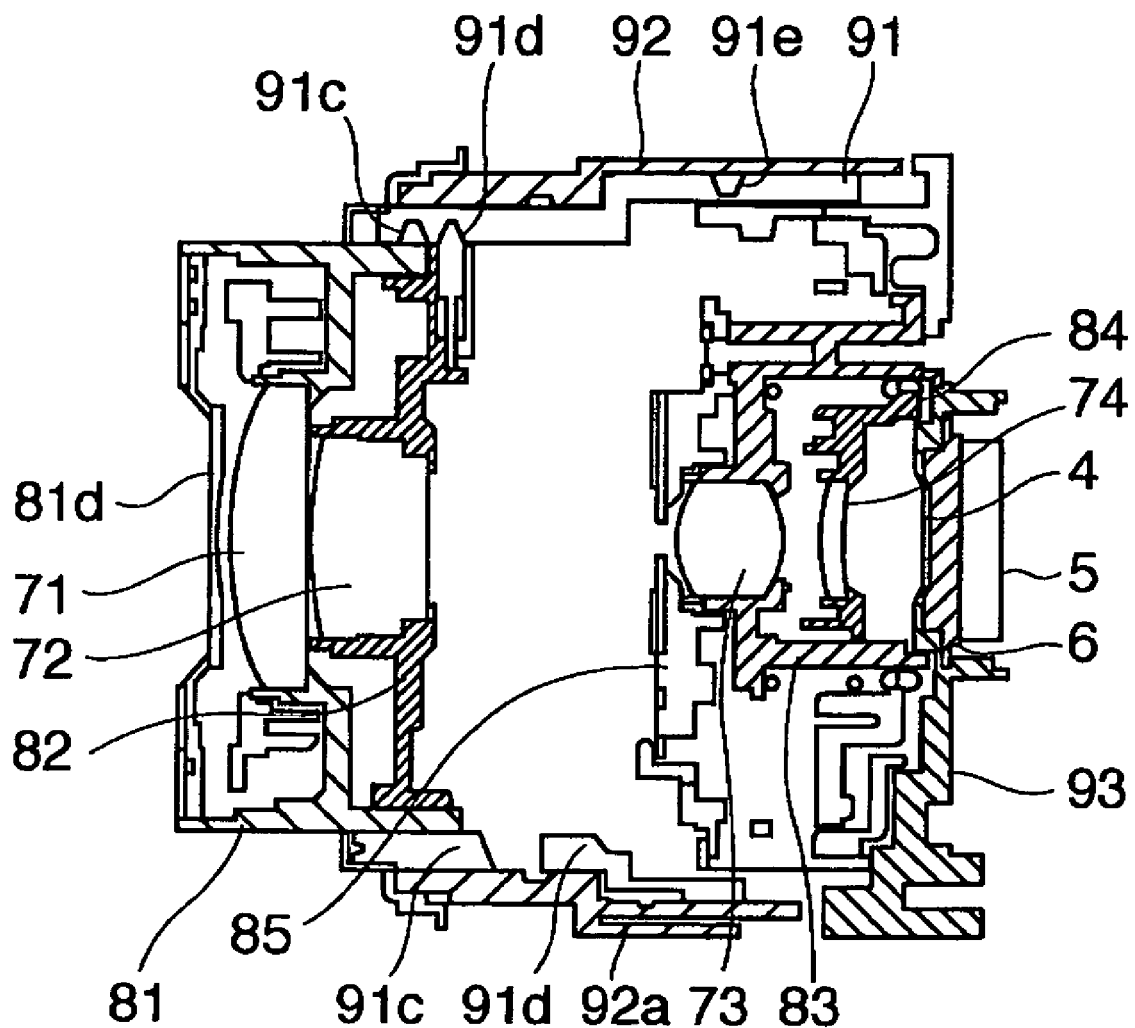
FIG. 22 is a longitudinal cross-sectional view of the lens barrel unit in a wide angle position of the camera shown in FIG. 21.
Figure 23:
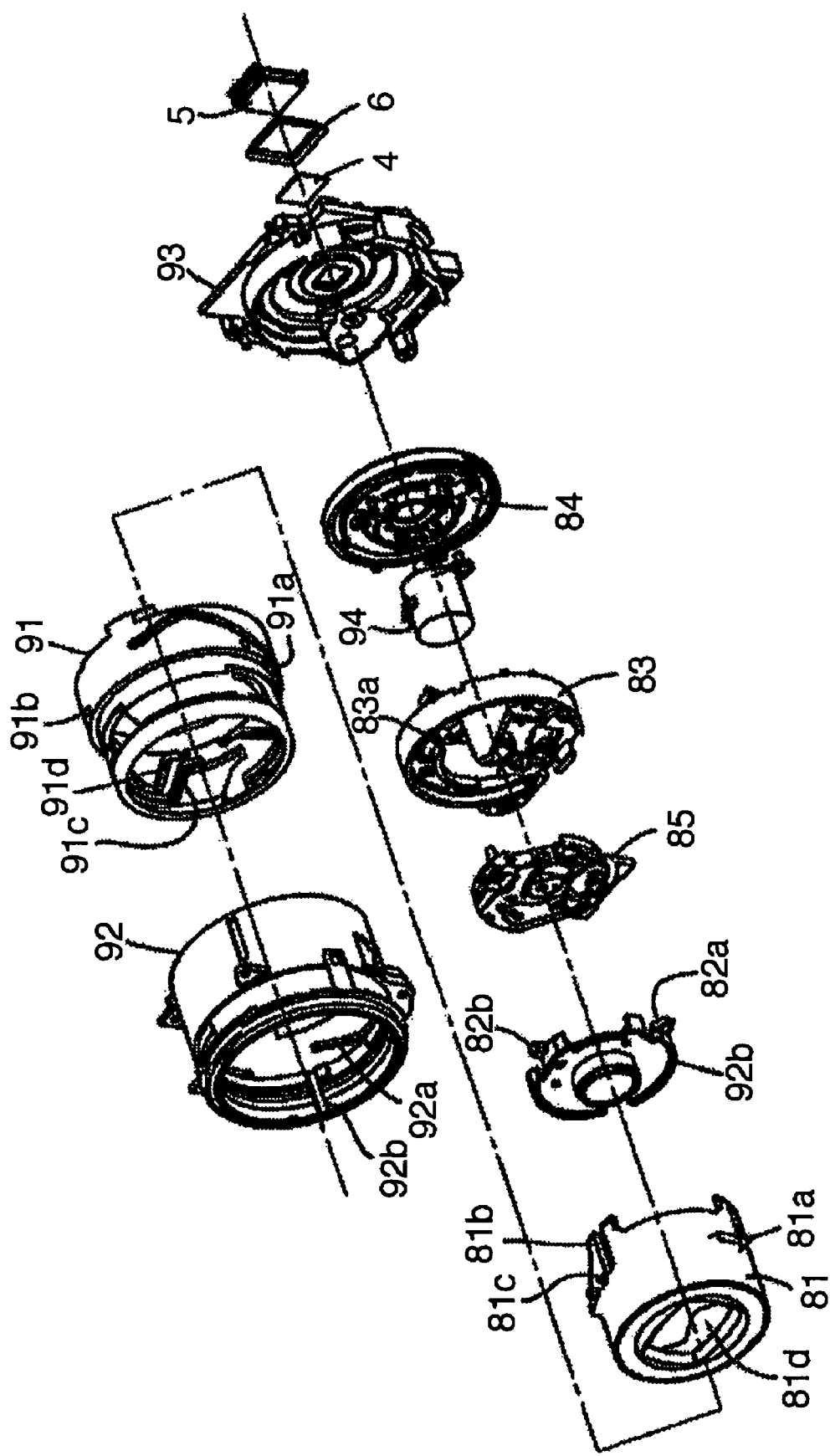
FIG. 23 is an exploded perspective view of the lens barrel unit in FIG. 21.
Figure 24:
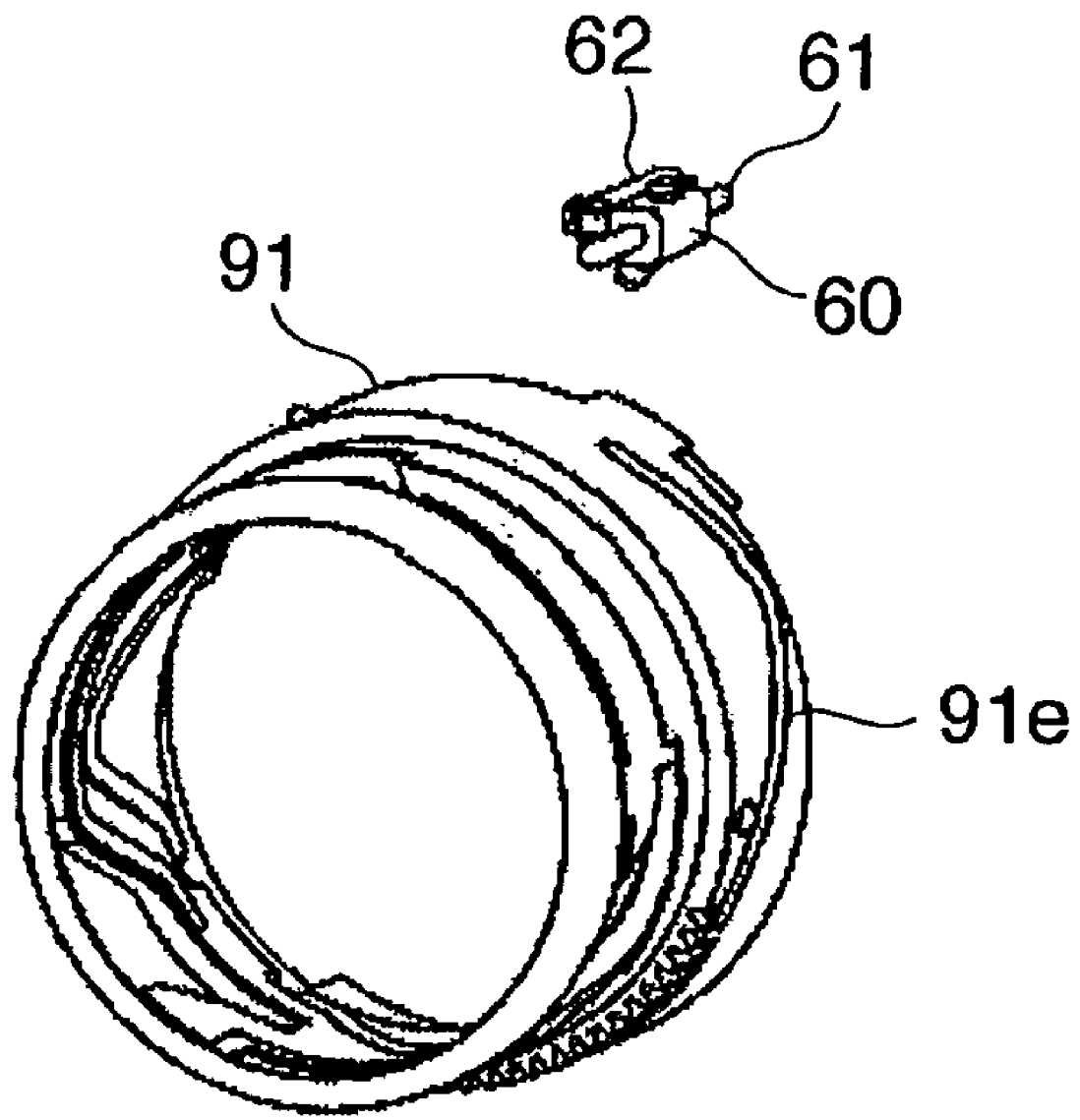
FIG. 24 is an exploded perspective view of a linkage mechanism that transmits a driving force from the lens barrel unit to the zoom finder device and the zoom strobe device.

Next, a second embodiment according to the present invention will be described with reference to FIGS. 21 to 24. FIG. 21 is a longitudinal cross-sectional view of a lens barrel unit in collapsed position of a camera incorporating a linkage mechanism between a zoom strobe device and a zoom finder device, according to a second embodiment of the present invention. FIG. 22 is a longitudinal cross-sectional view of the lens barrel unit in WIDE position of the camera shown in FIG. 21. FIG. 23 is an exploded perspective view of the lens barrel unit in FIG. 21. FIG. 24 is an exploded perspective view of the linkage mechanism that transmits a driving force from the lens barrel unit to the zoom finder device and the zoom strobe device.

In the present embodiment, the constructions of the zoom finder device and the zoom strobe device are the same as those of the zoom finder device and the zoom strobe device according to the first embodiment, and hence detailed description thereof is omitted. Further, in FIGS. 21 to 24, component parts identical or similar to those of the first embodiment are designated by identical reference numerals, and detailed description thereof is omitted.

Referring to FIGS. 21 to 23, the lens barrel unit is comprised of a first group barrel 81 for holding a first lens group 71, a second group barrel 82 for holding a second lens group 72, a third group barrel 83 for holding a third lens group 73, all of which have a magnification effect, a fourth group barrel 84 for holding a fourth lens group 74 for performing focus adjustment and image plane correction, a low-pass filter 4, a CCD 5, and a CCD rubber 6. The first and second group barrels 81 and 82 are held by a movable cam ring 91 having cam grooves formed in an inner surface thereof. The third group barrel 83 is fixed to a CCD holder 93.

The movable cam ring 91 is movably held by a fixed barrel 92. The fixed barrel 92 has an inner surface formed with three cam grooves 92a, and a straight advance guide groove 92b having a predetermined width and extending in the direction of the optical axis. The fixed barrel 92 is fixed to the CCD holder 93, and the CCD holder 93 holds the low-pass filter 4 and the CCD 5. Further, a focus motor 94 for driving the fourth group barrel 84 is fixed to the CCD holder 93.

The movable cam ring 91 has an outer periphery formed with an outer peripheral gear 91a which meshes with a gear associated with a gear system (not shown) for transmitting rotation of a zoom motor (not shown). Thus, the movable cam ring 91 is driven for rotation by the zoom motor. Further, the outer periphery of the movable cam ring 91 is formed with three follower pins 91b which are fitted in the cam grooves 92a of the fixed barrel 92, respectively, whereby the movable cam ring 91 moves in the direction of the optical axis while rotating along the cam grooves 92a of the fixed barrel 92. The movable cam ring 91 has an inner surface formed with two cam grooves 91c and 91d. Follower pins 81c and 82b formed on the first group barrel 81 and the second group barrel 82 are fitted in the cam grooves 91c and 91d, respectively.

A guide portion 81a formed integrally with the first group barrel 81 is slidably fitted in the straight advance guide groove 92b of the fixed barrel 92. Further, the first group barrel 81 has an outer surface formed with a straight advance guide groove 81b having a predetermined width and extending in the direction of the optical axis. A guide portion 82a formed integrally with the second group barrel 82 is slidably fitted in the straight advance guide groove 81b. This restricts rotations of the group barrels 81 and 82, whereby when the movable cam ring 91 is moved in the direction of the optical axis, the group barrels 81 and 82 are moved in the direction of the optical axis without being rotated. This makes it possible to position the lenses according to a desired focal length.

The first group barrel 81 is provided with a known lens barrier mechanism 81d. The lens barrier mechanism 81d is driven such that an optical path of a photographic optical system is blocked by a cam member 83a mounted to the third group barrel 83 when the camera is in collapsed position. Further, a known aperture shutter unit 85 is fixed to the third group barrel 83.

Next, a linkage mechanism for transmitting a driving force from the lens barrel unit to the zoom finder device and the zoom strobe device will be described with reference to FIG. 24.

In the present embodiment, the construction of the linkage member 60 is the same as that of the linkage member in the first embodiment, and hence detailed description thereof is omitted. As shown in FIG. 24, the present embodiment is distinguished from the above-described first embodiment in that a cam groove 91e to be fitted on the guide pin 60b of the linkage member 60 is formed in an outer surface of the movable cam ring 91 that moves forward and backward in the direction of the optical axis. Here, the cam groove 91e is formed in the movable cam ring 91 such that the relative positional relationship between the cam groove 91e and the linkage member 60 becomes equal to the relative positional relationship between the cam groove 24c formed in the outer surface of the drive ring 24 that does not move forward and backward in the direction of the optical axis and the linkage member 60 in the first embodiment.

Figure 25:
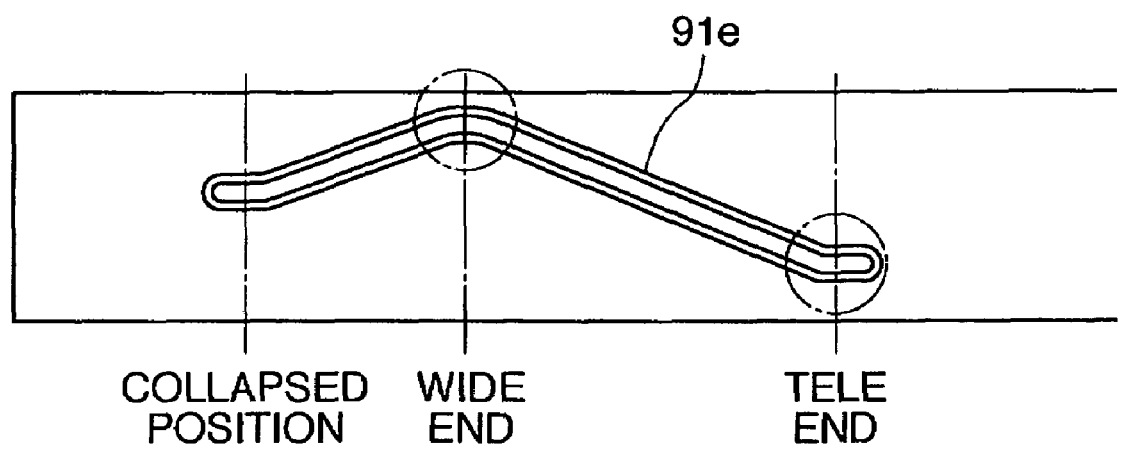
FIG. 25 is an unfolded view of an outer surface of a movable cam ring appearing in FIG. 23.
Figure 26:
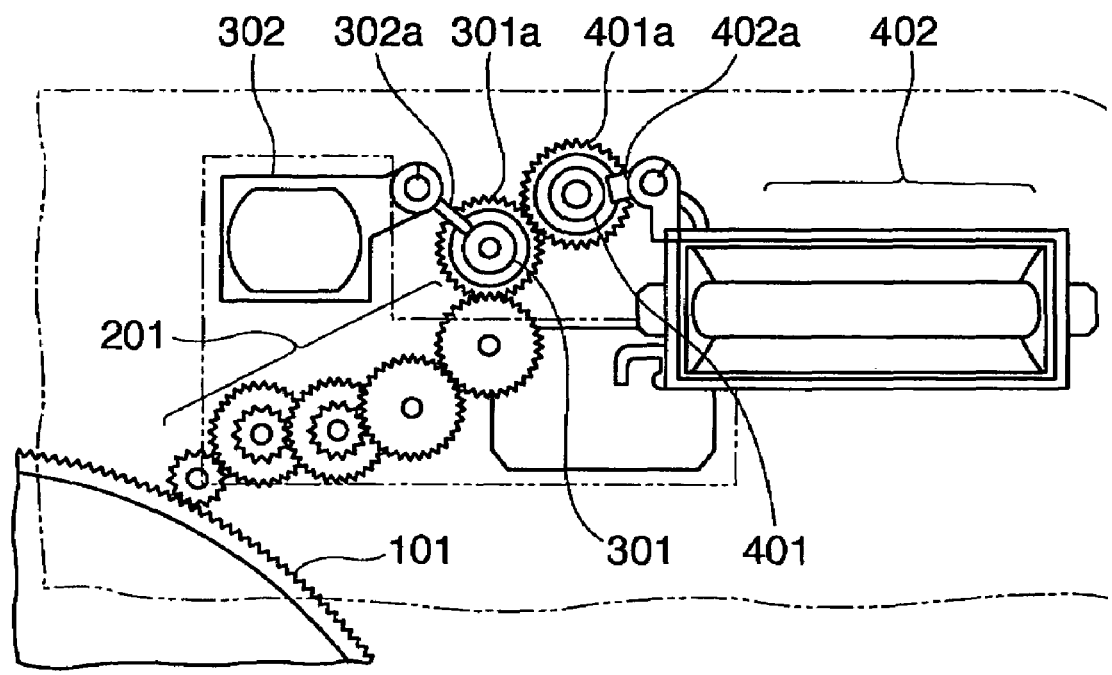
FIG. 26 is a cross-sectional view of a conventional linkage mechanism between a zoom strobe device and a zoom finder device.
Figure 27:
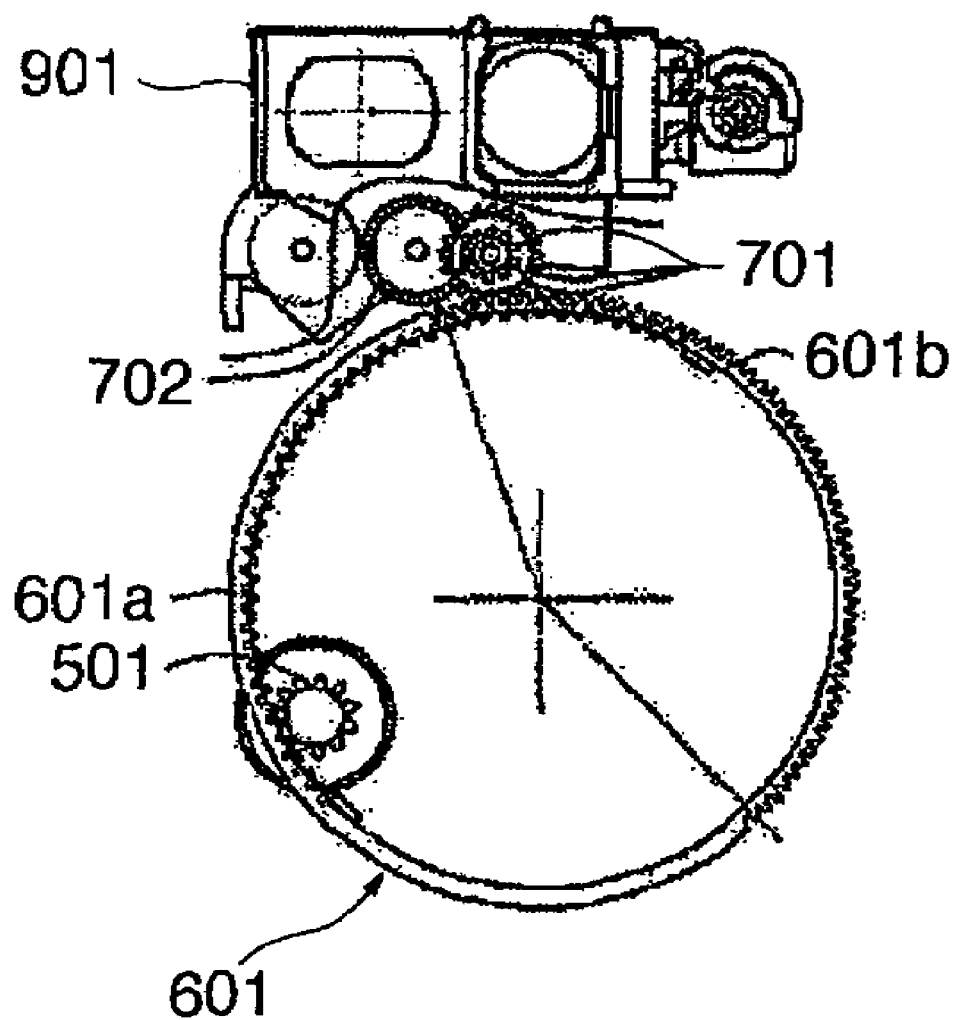
FIG. 27 is a cross-sectional view of a drive mechanism of another conventional zoom finder device.
Figure 28:
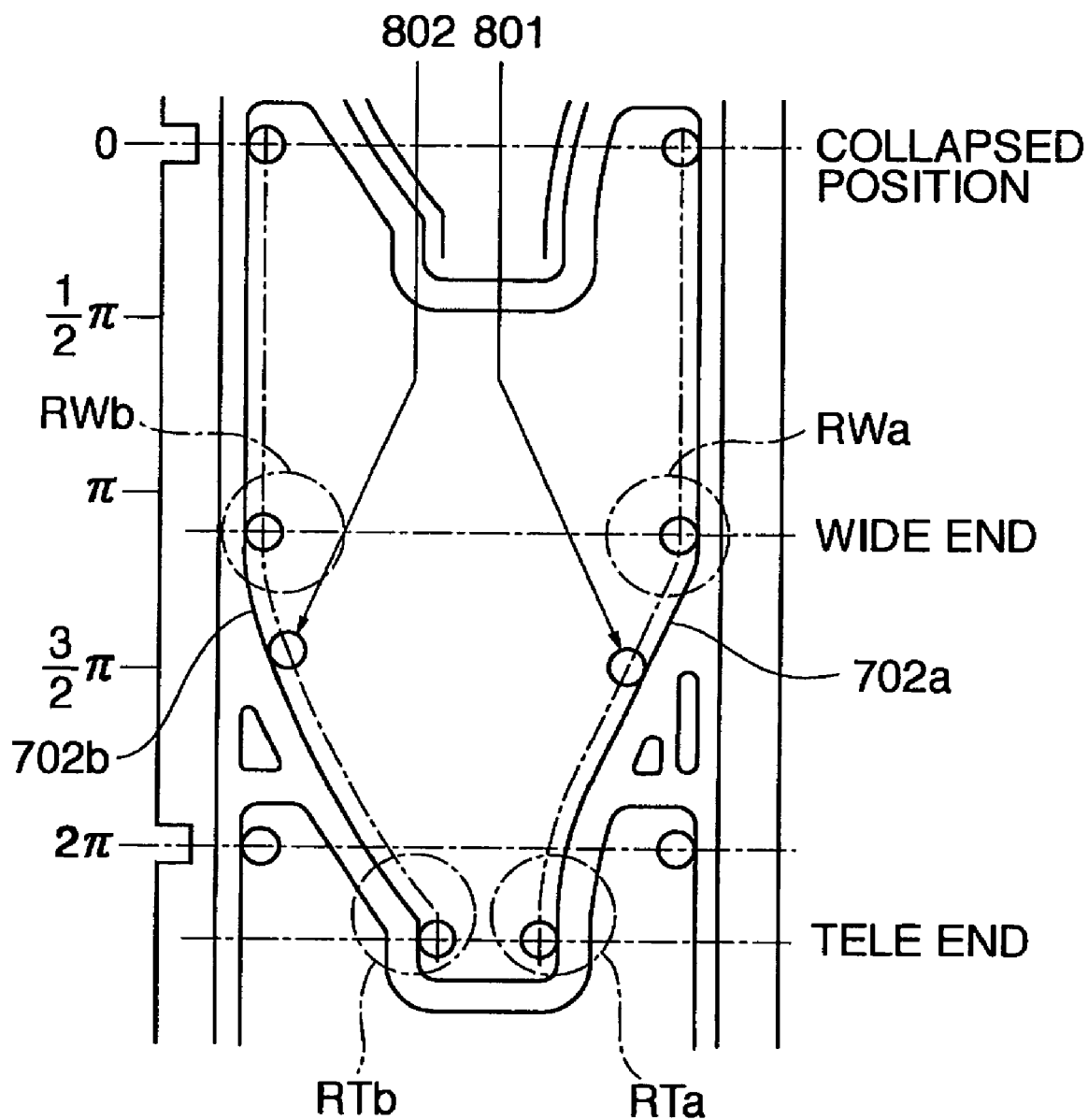
FIG. 28 is an unfolded view of a cam ring appearing in FIG. 27.

In the present embodiment, the construction of the linkage member 60 is the same as that of the linkage member in the first embodiment, and hence detailed description thereof is omitted. As shown in FIG. 23, the present embodiment is distinguished from the above-described first embodiment in that a cam groove 91e fitted on the guide pin 60b of the linkage member 60 is formed in an outer surface of the movable cam ring 91 that moves forward and backward in the direction of the optical axis. Here, the cam groove 91e is formed in the movable cam ring 91 such that the relative positional relationship between the cam groove 91e and the linkage member 60 becomes equal to the relative positional relationship between the cam groove 24c formed in the outer surface of the drive ring 24 that does not move forward and backward in the direction of the optical axis and the linkage member 60 in the first embodiment. Further, as shown in FIG. 25, similarly to the cam groove 24c in the first embodiment, the cam groove 91e is formed such that areas thereof corresponding to the WIDE end and the TELE end have no slopes. Therefore, as described in detail as to the first embodiment, the cam grooves formed in the cam plate 41 for the objective lenses need not be formed with areas which have no slopes.

As described above, according to the present embodiment, similarly to the first embodiment, the rotational movement of the lens barrel unit is converted to the linear movement of the cam plate 41 in the left-right direction orthogonal to the optical axis via one linkage member 60, whereby transmission of the driving force from the lens barrel unit to the zoom finder device and the zoom strobe device is attained. This makes it possible to reduce the number of component parts to thereby reduce the size of the camera, and further to simplify the linkage mechanism to thereby attain high-accuracy position control of the cam plate 41. Further, since there is no need to form slope-transition points in the cam grooves for the objective lenses, it is possible to cause the objective lenses to stably operate. Further, it is possible to dispense with separate component parts for obtaining a biasing force for preventing occurrence of jitter of an image, thereby making it possible to reduce the number of component parts.

This application claims the benefit of Japanese Applications Nos. 2005-011972 and 2005-011973 both filed Jan. 19, 2005, which are hereby incorporated by reference herein in their entirety.

What is claimed is:

1. A linkage mechanism between a zoom lens barrel unit and a zoom member disposed outwardly of the zoom lens barrel unit and having a zoom mechanism, comprising:
   a cam plate that is disposed for linear motion in a direction orthogonal to an optical axis of the zoom lens barrel unit, the linear motion of said cam plate changing a zoom state of the zoom member;
   a cam groove formed in an outer periphery of a drive ring disposed for rotation around the optical axis of the zoom lens barrel unit; and
   a linkage member having an engagement member that engages with the cam groove, said linkage member moving forward and backward in the direction of the optical axis as said engagement member moves following the cam groove along with rotation of said drive ring, thereby causing said cam plate to move linearly in the direction orthogonal to the optical axis of the zoom lens barrel unit,
   wherein said cam groove is provided with a dead area in which the motion of said linkage member is not caused by the rotation of said drive ring.

2. A linkage mechanism as claimed in claim 1, wherein:
   said cam plate has a cam groove formed therein,
   said linkage member is provided with a drive pin for engagement with the cam groove of said cam plate, and
   said cam plate linearly moves in the direction orthogonal to the optical axis of the zoom lens barrel unit in a manner interlocked with movement of said linkage member forward or backward in the direction of the optical axis.

3. A linkage mechanism as claimed in claim 1, wherein said drive ring forms a part of the zoom lens barrel unit, and is at least driven for rotation about the optical axis of the zoom lens barrel unit.

4. A linkage mechanism as claimed in claim 3, wherein said drive ring is driven for rotation about the optical axis of the zoom lens barrel unit without moving forward or backward in the direction of the optical axis of the zoom lens barrel unit.

5. A linkage mechanism as claimed in claim 3, wherein said drive ring moves forward or backward in the direction of the optical axis of the zoom lens barrel unit while being driven for rotation about the optical axis of the zoom lens barrel unit.

6. A linkage mechanism as claimed in claim 1, wherein a space is formed between the zoom lens barrel unit and said cam plate, and said linkage member is disposed in the space.

7. A linkage mechanism as claimed in claim 6, wherein said linkage member is disposed diagonally of an imaging screen of the zoom lens barrel unit.

8. A linkage mechanism as claimed in claim 1, wherein said dead area is formed at locations respectively corresponding to a wide angle end and a telephoto end of the zoom lens barrel unit, and the cam groove extends in the direction orthogonal to the optical axis of the zoom lens barrel unit in the dead area.

9. A linkage mechanism as claimed in claim 8, wherein said cam plate is provided with a cam groove for defining a profile of an objective lens cam for driving an objective lens contained in a finder optical system, and said cam groove has a slope that constantly changes.

10. A method of assembling an illumination range-changing device having a moving section that moves to change a range of illumination with illuminating light, and a zoom finder device having a lens group that moves to change magnification of a finder optical system, comprising:

a first step of assembling the illumination range-changing device and the zoom finder device to a base plate; and a second step of causing a cam plate that has a first cam groove formed therein for engaging with the lens group of the zoom finder device, and a second cam groove formed therein for engaging with the moving section of the illumination range-changing device, to slide with respect to the base plate, to thereby assemble the cam plate to the base plate, wherein said second step comprises a first sub-step of causing the lens group of the zoom finder device assembled to the base plate to be engaged with the first cam groove of the cam plate, in a first position outside a range of normal use of the zoom lens barrel unit, a second sub-step of causing the cam plate to slide with respect to the base plate from the first position to a second position which is within the range of normal use of the zoom lens barrel unit, and a third sub-step of causing the moving section of the illumination range-changing device to engage with the second cam groove of the cam plate in the second position, to thereby assemble the cam plate to the base plate.

11. A method as claimed in claim 10, wherein the base plate has a protrusion formed thereon in advance, and the cam plate has an engaging nail formed in advance thereon for engagement with the protrusion, and wherein in said second step, when the cam plate is slid with respect to the base plate from the first position to the second position, the engaging nail of the cam plate climbs over the protrusion of the base plate to be engaged with the protrusion, whereby the engagement between the engaging nail and protrusion prevents the cam plate from being detached from the base plate.

* * * * *